(12) United States Patent
Camenisch et al.

(10) Patent No.: US 10,277,395 B2
(45) Date of Patent: Apr. 30, 2019

(54) CRYPTOGRAPHIC KEY-GENERATION WITH APPLICATION TO DATA DEDUPLICATION

(71) Applicant: INTERNATIONAL BUSINESS MACHINES CORPORATION, Armonk, NY (US)

(72) Inventors: Jan L. Camenisch, Thalwil (CH); Angelo De Caro, Zürich (CH); Esha Ghosh, Providence, RI (US); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/600,142

(22) Filed: May 19, 2017

(65) Prior Publication Data

US 2018/0337775 A1  Nov. 22, 2018

(51) Int. Cl.
*H04L 9/08* (2006.01)
*H04L 9/00* (2006.01)
(Continued)

(52) U.S. Cl.
CPC ............ *H04L 9/0822* (2013.01); *H04L 9/008* (2013.01); *H04L 9/0861* (2013.01);
(Continued)

(58) Field of Classification Search
CPC .................................................. H04L 9/0822
(Continued)

(56) References Cited

U.S. PATENT DOCUMENTS

| 8,155,322 B2 * | 4/2012 | Bellare | H04L 9/085 380/286 |
| 8,189,769 B2 * | 5/2012 | Ramasamy | H04L 9/0637 380/28 |
| 2007/0294531 A1 | 12/2007 | Alten | |

FOREIGN PATENT DOCUMENTS

| CN | 103997407 A | 8/2014 |
| WO | 2016128070 A1 | 8/2016 |
| WO | 2016155804 A1 | 10/2016 |

OTHER PUBLICATIONS

Halevi, et al., "Proofs of Ownership in Remote Storage Systems", IBM T. J. Watson Research Center, Aug. 11, 2011, pp. 1-13, SFEROT project funded by the European Research Council (ERC), Yorktown, NY.

(Continued)

*Primary Examiner* — Kambiz Zand
*Assistant Examiner* — Thanh H Le
(74) *Attorney, Agent, or Firm* — Robert C. Bunker

(57) ABSTRACT

Generation of a cryptographic key is deterministically derived from client data of which a client computer proves knowledge in order to obtain the key. A client computer provides client data and is adapted to define a vector, having a plurality of data blocks with indices, corresponding to the client data. The client computer is further adapted to generate a first non-hiding vector commitment and a second hiding vector commitment, to the vector, and to generate a third commitment to the first commitment. The client computer sends the second and third commitments to the key server, and provides to the key server a first proof of knowledge, for a subset of the indices, of the corresponding data blocks of the vector in the second and third commitments. The key server stores a secret server key and is adapted to engage with the client computer in a key-generation protocol.

24 Claims, 8 Drawing Sheets

(51) Int. Cl.
  H04L 9/14      (2006.01)
  H04L 9/30      (2006.01)
  H04L 9/32      (2006.01)
(52) U.S. Cl.
  CPC .............. *H04L 9/0894* (2013.01); *H04L 9/14* (2013.01); *H04L 9/30* (2013.01); *H04L 9/3271* (2013.01)
(58) Field of Classification Search
  USPC ......................................................... 380/281
  See application file for complete search history.

(56) References Cited

OTHER PUBLICATIONS

Bellare, et al., "DupLESS: Server-Aided Encryption for Deduplicated Storage*", 2013 USENIX Security Symposium, Aug. 2013, pp. 1-16, Washington.

Armknecht, et al., "Transparent Data Deduplication in the the Cloud", 22nd ACM SIGSAC Conference on Computer and Communications Security, Copyright Oct. 2015, pp. 886-900, CCS' 15, Denver, Colorado.

Duan, "Distributed Key Generation for Secure Encrypted Deduplication", Dec. 1, 2013, pp. 1-25, Cryptology ePrint Archive, Beijing, China.

Dutch, "Understanding Data Deduplication Ratios", 2008 Storage Networking Industry Association Data Management Forum, Jun. 2008, pp. 1-13.

Storer, et al., "Secure Data Deduplication", Storage Systems Research Center, Copyright 2008, pp. 1-10, Fairfax, Virginia.

Liu, et al., "Secure Deduplication of Encrypted Data without Additional Independent Servers", CCS '15, Oct. 2015, pp. 874-885, Aalto University, Helsinki, Finland.

Mell et al., "The NIST Definition of Cloud Computing", NIST, Sep. 2011, pp. 1-3, Special Publication 800-145, U.S. Department of Commerce, Gaithersburg, MD.

Algesheimer, et al., "Efficient Computation Modulo a Shared Secret with Application to the Generation of Shared Safe-Prime Products", IBM Research, Mar. 2002, pp. 1-17, Zurich Research Laboratory, Switzerland.

Boneh, et al., "Bivariate Polynomials Modulo Composites and Their Applications", Springer-Verlag ASIACRYPT, Copyright 2014, pp. 1-21, Stanford University, CA.

Chase, et al., "Deja Q: Using Dual Systems to Revisit q-Type Assumptions", Eurocrypt 2014, pp. 1-32, Springer-Verlag 2014.

Camenisch, et al., "Efficient Group Signature Schemes for Large Groups", Advances in Cryptology—CRYPTO '97, 1997, pp. 1-15, Department of Computer Science ETH Zurich, Switzerland.

Camenisch, et al., "On the Portability of Generalized Schnorr Proofs", IBM Research, Eurocrypt 2009, pp. 1-18, Switzerland.

Camenisch, et al., "Practical Verifiable Encryption and Decryption of Discrete Logarithms", Crypto 2003, Aug. 2003, pp. 1-41, IBM Research, Zurich Research Laboratory, CH—8803 Ruschlikon, Switzerland.

Catalano, et al., "Vector Commitments arid Their Applications", Max Planck Institute for Software Systems (MPI-SWS), PKC 2013, pp. 1-37, NYU, New York.

Dodis, et al., "A Verifiable Random Function With Short Proofs and Keys", Department of Computer Science, New York University, PKC 2005, pp. 420-436, New York.

Dodis, et al., "Efficient Constructions of Composable Commitments and Zero-Knowledge Proofs", NYU Computer Science Dept., May 2008, pp. 1-36, New York.

Jarecki, et al., "Efficient Oblivious Pseudorandom Function with Applications to Adaptive OT and Secure Computation of Set Intersection", University of California, TC2009, pp. 1-18, Irvine, California.

Merkle, "A Certified Digital Signature", Communications of the ACM, Nov. 1979, pp. 218-279, Crypto 89, Palo Alto, CA.

Boneh, et al., "Short Signatures Without Random Oracles", Eurocrypt 2004, pp. 56-73, vol. 3027 of LNCS, Berlin, Germany.

International Searching Authority, "Notification of Transmittal of the International Search Report and the Written Opinion of the International Searching Authority, or the Declaration," Patent Cooperation Treaty, dated Sep. 4, 2018, 8 Pages, International Application No. PCT/IB2018/053465.

\* cited by examiner

CRYPTOGRAPHIC KEY-GENERATION WITH APPLICATION TO DATA DEDUPLICATION

BACKGROUND OF THE INVENTION

The present invention relates generally to generation of cryptographic keys, and more particularly to generation of keys which are deterministically derived from data held by computers using the keys. Embodiments of the invention may be applied in data deduplication systems.

SUMMARY

According to at least one embodiment of the present invention there is provided a system comprising a client computer and a key server adapted for communication via a network. The client computer provides client data and is adapted to define a vector x, having a plurality n of data blocks $x_i$ with indices i=1 to n, corresponding to the client data. The client computer is further adapted to generate a first commitment, being a non-hiding vector commitment, to the vector x, to generate a second commitment, being a hiding vector commitment, to the vector x, and to generate a third commitment to the first commitment. The client computer sends the second and third commitments to the key server, and provides to the key server first proof of knowledge, for a subset of the indices i, of the corresponding data blocks $x_i$ of the vector x in the second and third commitments. The key server stores a secret server key k and is adapted, in response to verification of the first proof of knowledge, to engage with the client computer in a key-generation protocol. In this protocol, the client computer is adapted to send to the key server a blinded function of the first commitment and provide to the key server second proof of knowledge of the first commitment in this blinded function and in the third commitment. The key server is adapted, in response to verification of the second proof of knowledge, to generate from the aforementioned blinded function a blinded key K' comprising a blinded function of the first commitment and the server key k, and to send the blinded key K' to the client computer. The client computer is further adapted to unblind the blinded key K' to obtain a client key K comprising a deterministic function of the first commitment and the server key k.

DETAILED DESCRIPTION

Generation of a cryptographic key as a deterministic function of data provided at a computer is fundamental to secure data deduplication systems. Data deduplication is a process used to reduce storage requirements by ensuring that a storage system only stores one copy of a particular data item, such as a file. If storage of a second copy of a previously-stored file is requested, this is detected by the storage server, typically by comparing a hash of the file with hashes of files already stored by the server. If a match is detected, the new file is not stored and the server simply stores a pointer to the matching, previously-stored file.

Where client computers send data to a storage server outside their trust domain (e.g. a cloud-based storage provider) security requires that the data is encrypted before it is sent for storage. To permit deduplication, the encryption process may be deterministic (i.e. the same data encrypts to the same cipher-text) so that matches may be detected. Furthermore, requiring that the same data may be encrypted using the same encryption key. For effective cross-user deduplication, where a storage server performs deduplication for data sent by different client computers, all client computers may be able to derive the same key for encrypting the same file.

Typically, schemes for key derivation may depend solely on a public hash of the client data and not on the data itself. Hence, a malicious party may get the encryption key for a file by knowing the hash of the file alone. Therefore, any system deploying such schemes would be insecure in a realistic security model: an adversary who obtains the cipher-text for a file due to any compromise of the storage server, or a malicious storage provider itself, may use the key to decrypt it.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 1:
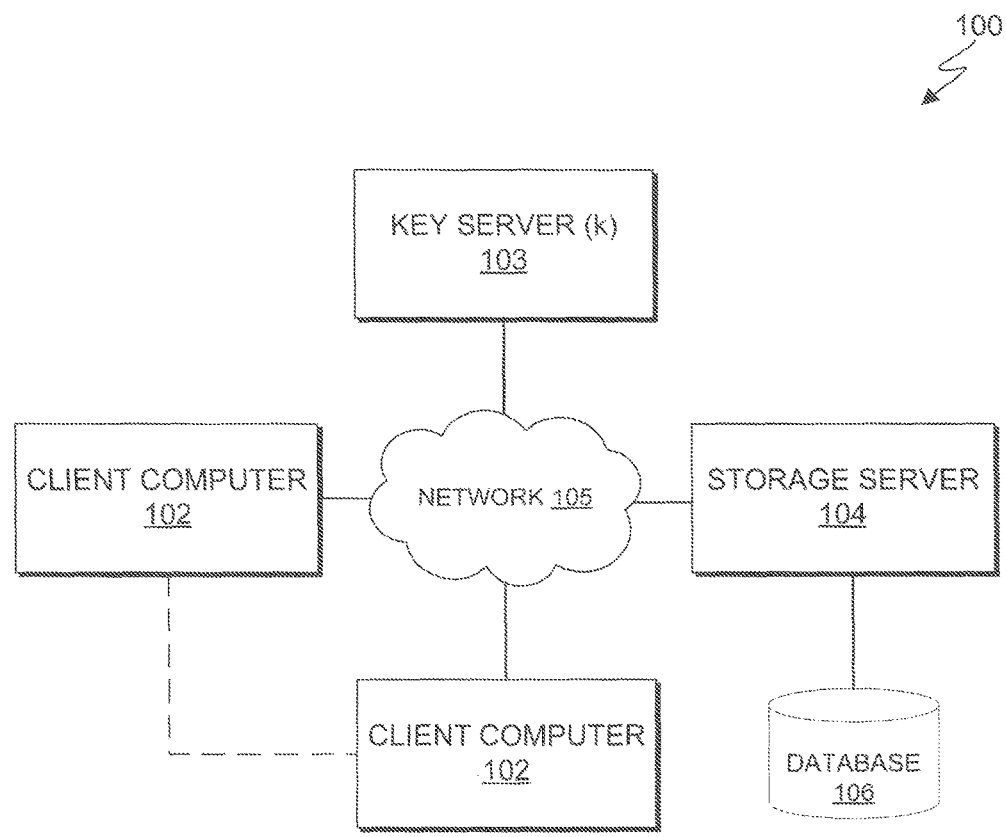
FIG. 1 is a block diagram of a system, in accordance with an embodiment of the present invention.

FIG. 1 is a block diagram of system 100, in accordance with an embodiment of the present invention. System 100 comprises a plurality of client computers 102, key server 103, and storage server 104. Client computers 102 may be adapted for communication with key server 103 and storage server 104 via network 105, where network 105 may include one or more component networks and/or internetworks including the Internet. In operation of system 100, client computers 102 send client data (e.g., data files) via network 105 for storage by storage server 104. Storage server 104 may be outside the trust domain of client computers 102, such that all files are encrypted by client computers 102 before transmission to storage server 104. Storage server 104 may store encrypted files received from client computers 102 in storage, represented by database 106, operatively coupled to storage server 104. Storage server 104 performs deduplication for encrypted files stored in database 106. For example, the granularity of deduplication may be an entire encrypted file. Accordingly, storage server 104 may store one copy of any given encrypted file in database 106. Storage server 104 may detect whether a second copy of a previously-stored encrypted file is received from one of client computers 102, as described in greater detail below. Storage server 104 may not store the encrypted file again, but instead may send a pointer to the identical, previously-stored file to one of client computers 102 in question.

Each of client computers 102 may encrypt a file for storage using a client key, denoted by K, for that file. To permit deduplication of files across client computers 102, identical client files may encrypt to identical cipher-texts and may be encrypted using the same cryptographic key. Accordingly, if different client computers 102 encrypt identical files, then each of client computers 102 may use the same client key for the file. Client keys K are obtained by client computers 102 via interaction with key server 103. Key server 103 may store a cryptographic key k which is secret to key server 103. To obtain a client key K, client computers 102 may engage in a cryptographic protocol with key server 103, whereby one of the client computers 102 obtains a key K which is a deterministic function of the server key k and the client file to be encrypted. This protocol may require client computers 102 to prove knowledge of the client file in order to obtain the key K. Accordingly, a client key may only be obtained by one of client computers 102 in possession of the client file itself, and not a short hash of the file. Key server 103 may be untrusted by client computers 102, such that the protocol may be performed without key server 103 learning the client file and/or the resulting client key K.

Key server 103 may be implemented by a computer operated by an entity providing a key-generation service to client computers 102 (e.g. a cloud service provider). Storage server 104 may similarly be implemented by a computer operated by a storage service provider (e.g. a cloud storage provider). Database 106 may include any data storage apparatus including one or more data storage media, and may be implemented by distributed storage apparatus in a cloud storage environment. A typical storage apparatus may include a disk storage apparatus comprising one or more disks, such as magnetic or optical disks, which may be internal to a computer (e.g., in a hard disk drive), or provided by externally-accessible disk apparatus (e.g. in a disk drive array such as a redundant array of independent disks).

Client computers 102 may be implemented, for example, by a user computer such as a desktop computer, laptop computer, tablet, notebook, palmtop, mobile phone, PDA (personal digital assistant), personal music player, etc., or any other computer using remote storage for storing data.

In general, client computers 102, key server 103, storage server 104 of system 100 may be implemented by one or more general or special-purpose computers, which may comprise one or more real and/or virtual machines, providing functionality for implementing the operations described herein. This functionality may be provided by logic implemented in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 2:
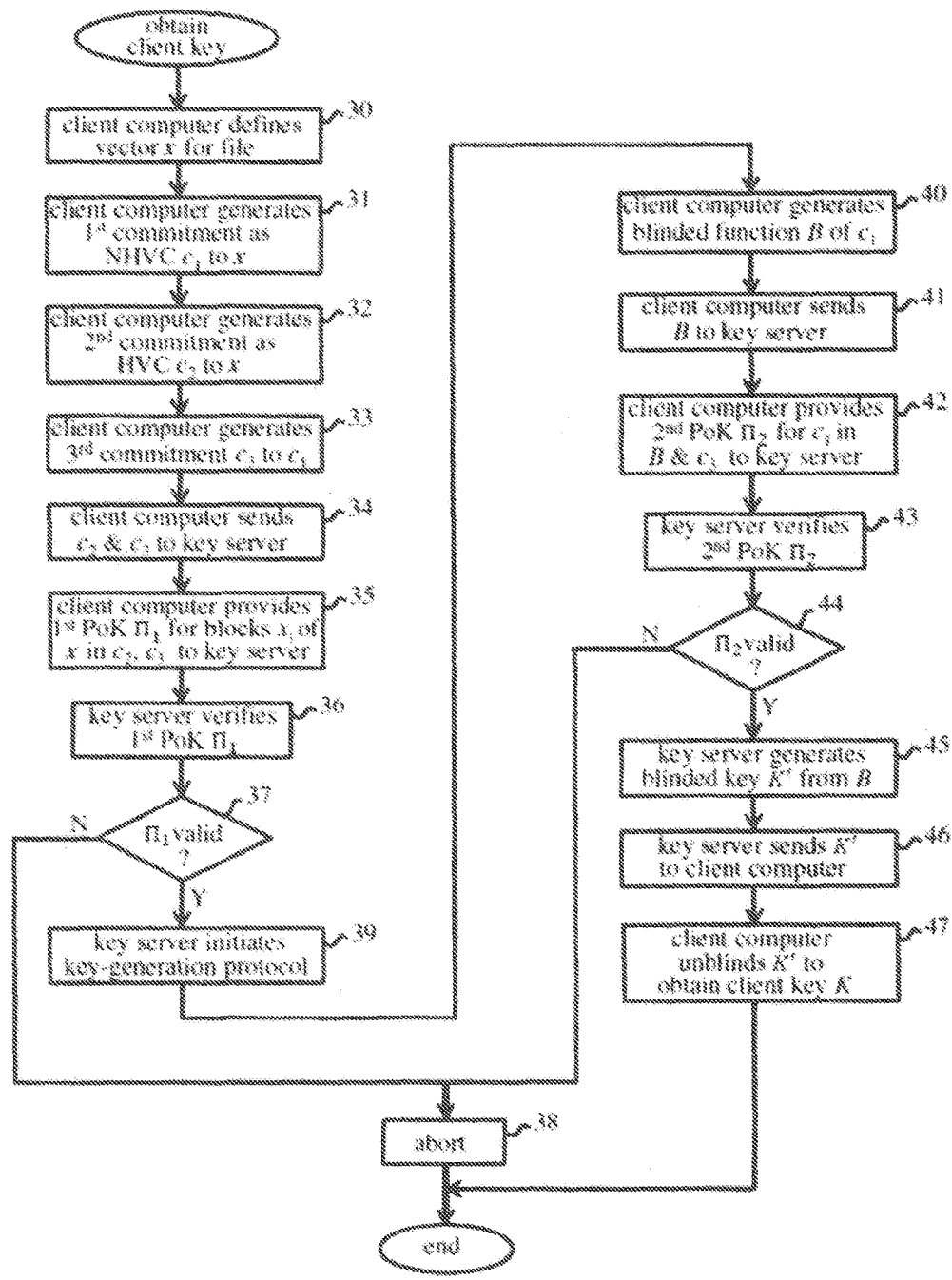
FIG. 2 is a flowchart illustrating operational steps for generating a client key, in accordance with an embodiment of the present invention.

FIG. 2 is a flowchart illustrating operational steps for generating a client key, in accordance with an embodiment of the present invention. When client computer 102 sends a client file F for storage, client computer 102 first contacts key server 103 to obtain a client key K for the file. In step 30, client computer 102 defines a vector x, having a plurality of n of data blocks $x_i$ with indices i=1 to n, corresponding to its file F. In step 30, client computer 102 may partition the file F into n data blocks $x_1, x_2, \ldots x_n$ of arbitrary length, or may encode the file F, as described in greater detail below, and then partition the resulting encoded file into n blocks $x_i$. In step 31, client computer 102 generates a first cryptographic commitment to the vector x. This first commitment, denoted by $c_1$, is a non-hiding vector commitment (NHVC), as described in greater detail below. In step 32, client computer 102 may also generate a second cryptographic commitment to the vector x. The second commitment, denoted by $c_2$, is a hiding vector commitment (HVC), as described in greater detail below. Additionally, in step 33, client computer 102 generates a third commitment, denoted by $c_3$, to the first commitment $c_1$. The third commitment $c_3$ is a "normal" cryptographic commitment (i.e. having the usual hiding and binding properties of a cryptographic commitment), as described in greater detail below. Client computer 102 sends the second and third commitments $c_2$ and $c_3$ to key server 103, as indicated by step 34. Furthermore, in step 35, client computer 102 provides to key server 103 a first cryptographic proof of knowledge (PoK), denoted by $\Pi_1$, which proves knowledge by client computer 102, for a subset of the indices i, of the corresponding data blocks $x_i$ of the vector x in the second and third commitments $c_2$ and $c_3$. This first proof $\Pi_1$ may be implemented in different stages as exemplified below. In other embodiments, the subset of indices i for which proof $\Pi_1$ is made may be selected by client computer 102. In one embodiment, this subset may be randomly selected by key server 103 for enhanced security. The size of the subset may be tuned, modified, and/or adjusted as desired, as described in greater detail below.

In step 36, key server 103 verifies the first proof $\Pi_1$ in relation to $c_2$ and $c_3$ before proceeding further. If the proof is invalid ("N" branch, decision block 37), then key server 103 aborts the protocol in step 38 and the operation terminates. Accordingly, key server 103 may send an appropriate message to client computer 102 indicating that verification has failed. After successful verification of $\Pi_1$, ("Y" branch, decision block 37), key server 103 proceeds to step 39 in which the key-generation protocol is initiated. Key server 103 may communicate with client computer 102 to initiate the protocol in this step, and may send data required for the key generation process, as described in greater detail below.

Assuming the key generation protocol is initiated, in step 40 client computer 102 generates a blinded function, denoted by B, of the first commitment $c_1$. Client computer 102 sends the blinded function B to key server 103 in step 41, and in step 42 client computer 102 provides to key server 103 a second cryptographic proof of knowledge denoted by $\Pi_2$. The second proof $\Pi_2$ proves knowledge by client computer 102 of the first commitment $c_1$ in both the blinded function B and the third commitment $c_3$ sent in step 34. Key server 103 verifies the second proof $\Pi_2$ in relation to B and $c_3$ in step 43. If verification fails ("N" branch, decision block 44), then the operation reverts to step 38 where the protocol is aborted and operation terminates. In response to verification of $\Pi_2$ ("Y" branch, decision block 44), the operation proceeds to step 45 in which key server 103 generates a blinded key K' from the blinded function B received in step 41. This blinded key K' comprises a blinded function of the first commitment $c_1$ and the secret server key k. Key server 103 then sends the blinded key K' to client computer 102 in step 46. On receipt, client computer 102 unblinds the blinded key K' to obtain the final client key K.

Due to operation of the foregoing protocol, the resulting client key K is a deterministic function of the first commitment $c_1$ and the secret server key k. Since the first commitment is a non-hiding vector commitment to the vector x, the client key K is thus a deterministic function of the vector x and the server key k. However, while $c_1$ is non-hiding, key server 103 receives only the blinded function B of this commitment and does not learn $c_1$ itself (which would reveal information on the client file F). The client key K may thus be obliviously generated via key server 103 without key server 103 learning the client file F or the final client key K which is only obtained after unblinding at client computer 102. Moreover, client computer 102 may only obtain the client key K after proving knowledge of data blocks $x_i$ for the actual file F underlying that key. The particular combination of commitments and proofs of knowledge ensures that a client key K may only be generated for the same file F as that for which knowledge of data blocks has been proved. In particular, the second, hiding vector commitment $c_2$ allows proof of knowledge of the file blocks $x_i$ to be made without revealing the file blocks to key server 103, and the first proof $\Pi_1$ proves that the same vector x underlies this commitment $c_2$ and the third commitment $c_3$. This third commitment $c_3$ commits to the first commitment $c_1$ which in turn provides (when blinded in function B) the client input to the key-generation protocol of steps 39 to 47. The second proof $\Pi_2$ then proves that the third commitment $c_3$ is computed from the same value ($c_1$) as the blinded function B in the key-generation protocol. The third commitment $c_3$ thus serves to link the two parts of the protocol (i.e. proof of knowledge of file blocks and key generation) while the overall set of commitments and proofs allows each part of the protocol to be performed unknowingly by key server 103.

Figure 3:
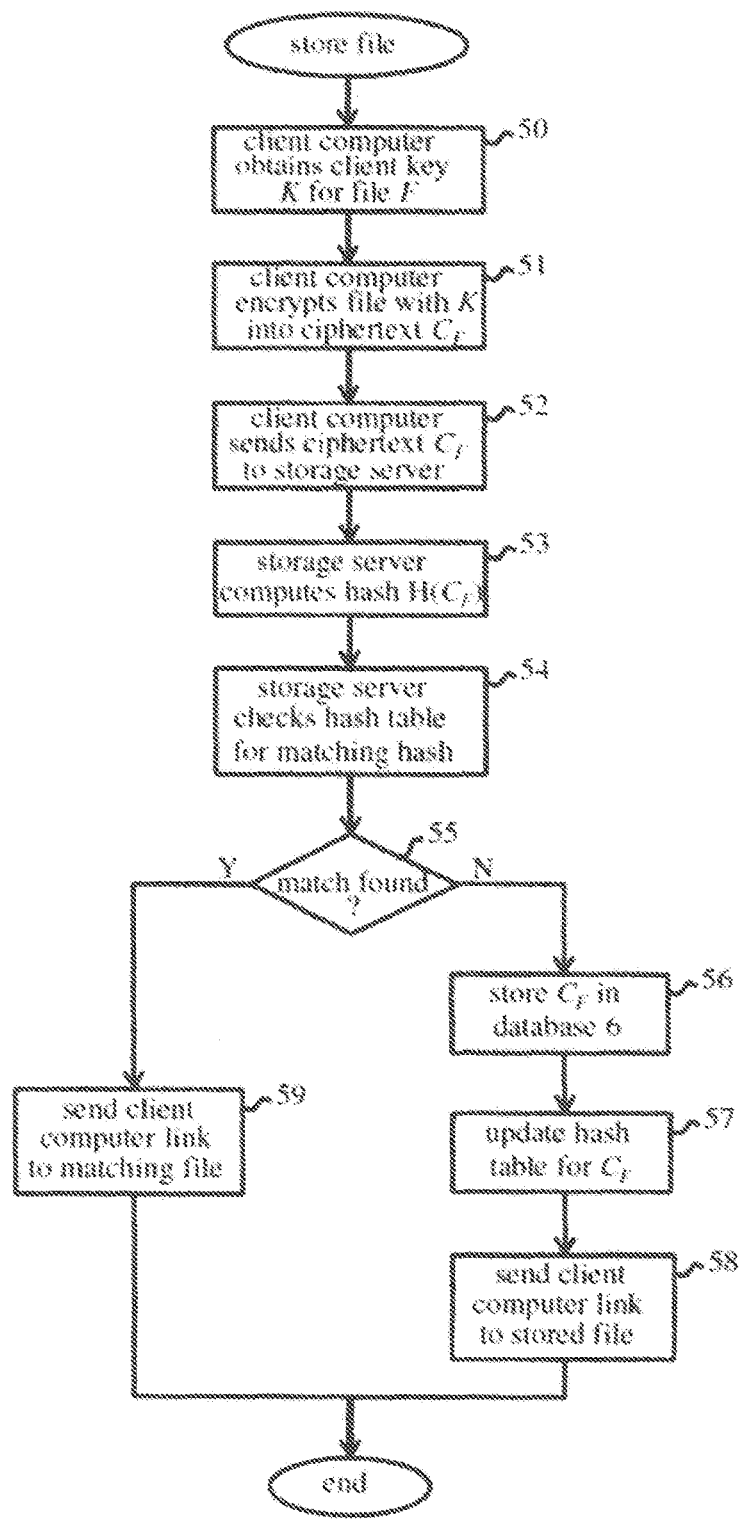
FIG. 3 is a flowchart illustrating operational steps for storing client data, in accordance with an embodiment.

FIG. 3 is a flowchart illustrating operational steps for storing client data, in accordance with an embodiment. In step 50, client computer 102 obtains the client key K for its file F via the process of FIG. 2. In step 51, client computer 102 encrypts the file F, using the client key K, via a symmetric encryption scheme to produce a cipher-text (i.e., an encrypted file) $C_F$. In step 52, client computer 102 then sends the cipher-text $C_F$ to storage server 104 via network 105. In step 53, storage server 104 applies a hash function H to the cipher-text $C_F$ to obtain a hash value $H(C_F)$. To permit deduplication, storage server 104 maintains a hash table indicating, for every encrypted file $C_F$ stored in database 106, the hash value $H(C_F)$ for that file and the file location in database 106. In another embodiment, storage server 104 may also stores additional data (e.g., id data such as a file id, client id, etc.), for a stored file along with any further data that may be required for access control. In step 54, storage server 104 compares the hash value obtained in step 53 with all hash values in the table to determine if a match exists. If no match is found ("N" branch, decision block 55), then in step 56 storage server 104 stores the received cipher-text $C_F$ in database 106. In step 57, storage server 104 updates the hash table with the new hash value $H(C_F)$ and storage location for $C_F$. In step 58, storage server 104 then sends client computer 102 a link to its stored file $C_F$, and the operation is complete. Returning to decision block 55, if a match is found ("Y" branch, decision block 55), then an identical encrypted file $C_F$ is already stored in database 106. Furthermore, in step 59 storage server 104 sends client computer 102 a link to the address of the previously-stored, identical file in database 106, and $C_F$ need not be stored again.

Each of client computers 102 stores client keys K for files to enable decryption of the corresponding cipher-texts when subsequently retrieved from storage server 104 by accessing the links provided in steps 58 or 59 above. A client key K may be stored at client computer 102 or may be stored, in encrypted form, at a remote location (e.g. at storage server 104), and retrieved when required by client computer 102. In general, since each client key K is a deterministic function of the key server's 103 key k and the file F encrypted under that client key, all client computers 102 may obtain identical client keys for identical files, and identical cipher-texts $C_F$ will be obtained for identical files, thus permitting deduplication at storage server 104 and decryption by one client computer of an identical file stored by another client computer 102. However, since possession of the file itself, and not just a short hash, may be proved to obtain a client key, storage server 104 may not obtain client keys by participating as a client with key server 103.

In another embodiment, the hash value $H(C_F)$ for an encrypted file may be computed at client computer 102 and sent to storage server 104 instead of the cipher-text $C_F$ in step 52. In this embodiment, step 53 is omitted. If no matching, pre-stored file is identified in step 55, storage server 104 requests the encrypted file $C_F$ from client computer 102 for storage in step 56. Here, therefore, the step of sending the encrypted file $C_F$ to the storage server is dependent on no match being found at step 55, and only the first client computer 102 which encrypts a given file F will need to send $C_F$ to storage server 104.

Figure 4A:
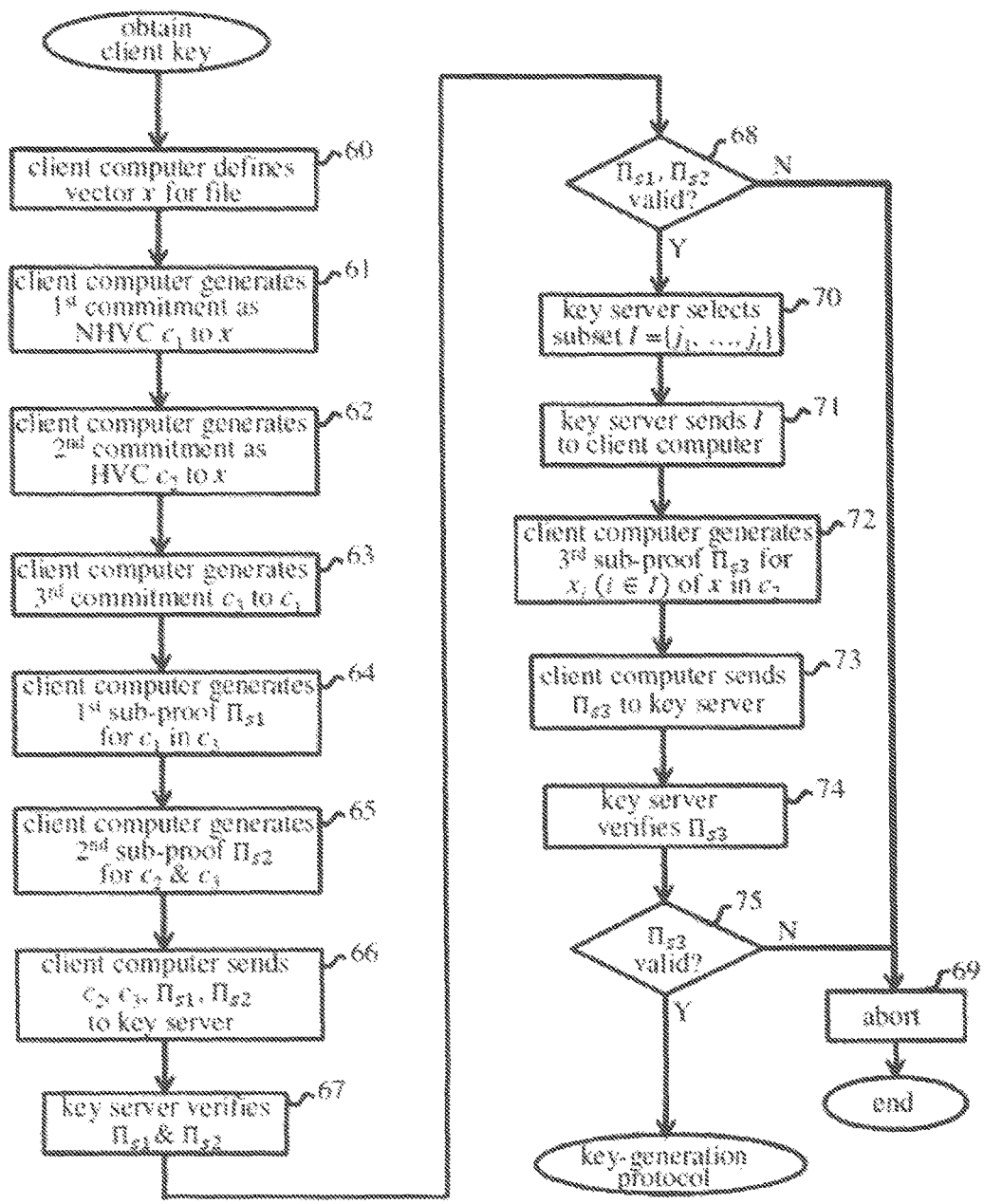
FIGS. 4A and 4B are flowcharts illustrating operational steps for generating the client key, in accordance with another embodiment of the present invention.
Figure 4B:
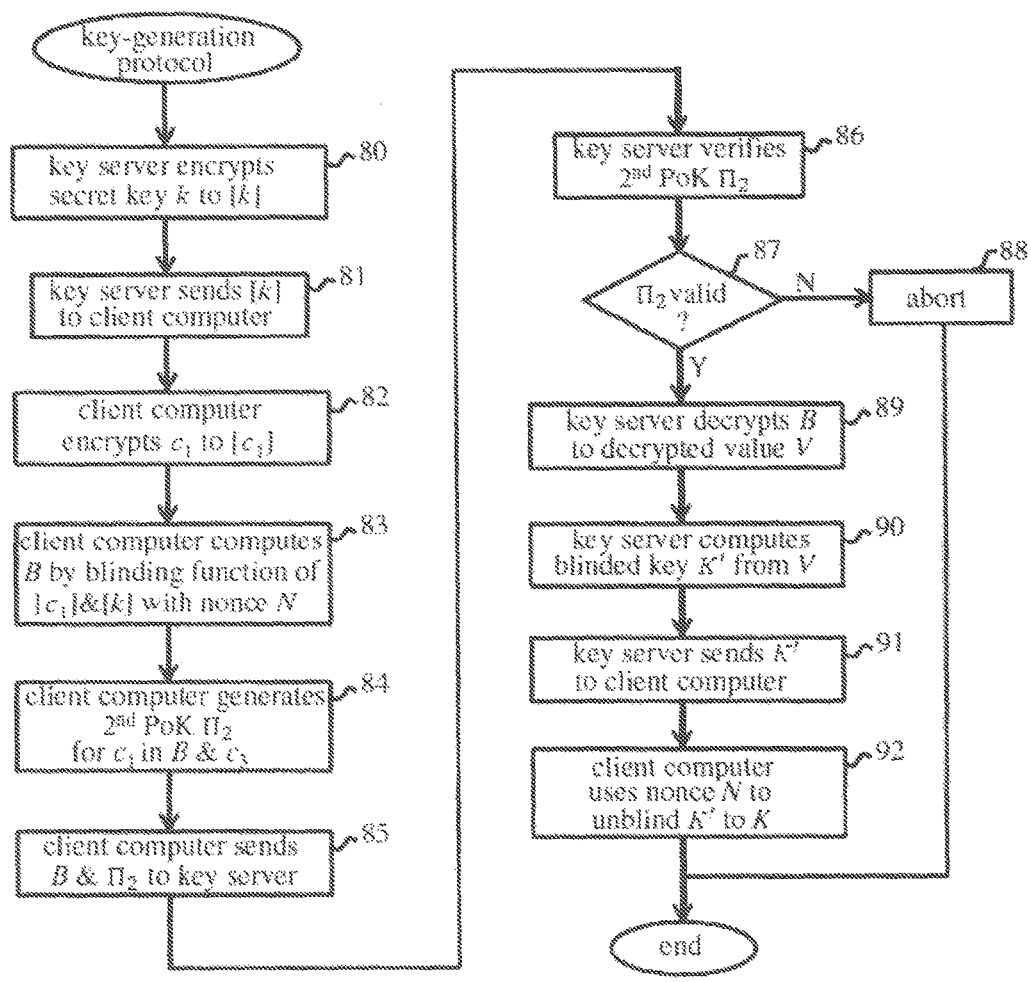

FIGS. 4A and 4B are flowcharts illustrating operational steps for generating the client key, in accordance with another embodiment of the present invention. Steps 60 to 63 of FIG. 4A correspond to steps 30 to 33 of FIG. 2. In step 64, client computer 102 generates a first sub-proof, denoted by $\Pi_{s1}$, proving knowledge by client computer 102 of the first commitment $c_1$ in the third commitment $c_3$. In step 65, client computer 102 generates a second sub-proof, denoted by $\Pi_{s2}$ proving that the second and third commitments $c_2$ and $c_3$ are computed from a common value. Both commitments may be derived from the same vector x, though the common value here may be a function of x as exemplified below. In step 66, client computer 102 sends the first and second sub-proofs $\Pi_{s1}$, $\Pi_{s2}$ to key server 103 with the second and third commitments $c_2$, $c_3$. In step 67, key server 103 verifies the sub-proofs $\Pi_{s1}$, $\Pi_{s2}$ in relation to $c_2$ and $c_3$. If verification fails ("No" at decision block 68), then key server 103 aborts the protocol in step 69 and operation terminates. On successful verification ("Yes" at decision block 68), in step 70 key server 103 selects a subset $I=\{j_1, \ldots, j_t\}$ of the position indices i=1 to n, where the number t of indices in subset I may be selected as desired based on security and efficiency constraints. Key server 103 sends the selected subset I to client computer 102 in step 71. On receiving the subset I, in step 72 client computer 102 generates a third sub-proof, denoted by $\Pi_{s3}$. This sub-proof $\Pi_{s3}$ proves knowledge, for each of the position indices i in subset I, of the data block $x_i$ at position i of the vector x in the second commitment $c_2$. Client computer 102 sends the third sub-proof $\Pi_{s3}$ to key server 103 in step 73. Key server 103 verifies the sub-proof $\Pi_{s3}$ in relation to $c_2$ in step 74.

In this embodiment, therefore, the first proof of knowledge $\Pi_1$ in FIG. 2 is implemented by the three sub-proofs $\Pi_{s1}$ to $\Pi_{s3}$, and verification of the third sub-proof $\Pi_{s3}$ by key server 103 completes verification of the proof $\Pi_1$. In effect, the first sub-proof $\Pi_{s1}$ proves knowledge of the content of $c_3$, the second sub-proof $\Pi_{s2}$ links the content of $c_2$ and $c_3$, and third sub-proof $\Pi_{s3}$ proves knowledge of the file blocks in the vector x underlying $c_2$ (and hence $c_3$ via the earlier sub-proofs), thus completing the proof $\Pi_1$. The three sub-proofs here provide an efficient implementation of the required proof of knowledge of the file for which the client key will be generated, without revealing any information about the file itself to key server 103. If verification of $\Pi_{s3}$ fails ("No" at decision block 75), key server 103 aborts and operation terminates. If verification succeeds ("Yes" at decision block 75), then key server 103 proceeds to the key-generation protocol of FIG. 4A.

In step 80 of FIG. 4B, key server 103 encrypts its secret key k via a homomorphic encryption scheme HES under a public key epk of a public/private key pair (epk, esk) of the scheme. Typically, a homomorphic encryption scheme has a homomorphic property, whereby there exists an efficient operation $\odot$ on ciphertexts $C=HES.Enc_{epk}(m)$ encrypting a message m under the public key epk such that, if $C_1 \in HES.Enc_{epk}(m_1)$ and $C_2 \in HES.Enc_{epk}(m_2)$, then $C_1 \odot C_2 \in HES.Enc_{epk}(m_1 \cdot m_2)$ for a group operation "$\cdot$". Key server 103 sends the resulting encrypted key $[k]=HES.Enc_{epk}(k)$ to client computer 102 in step 81. In step 82, client computer 102 encrypts the first commitment $c_1$ under the public key epk via the encryption scheme HES to produce an encrypted commitment $[c_1]=HES.Enc_{epk}(c_1)$. In another embodiment, the public key epk may be published generally by key server 103 and available to all client computers 102. For enhanced security in preferred embodiments, however, the key-pair (epk, esk) is newly-generated by key server in step 80 and the public key epk is sent to the client computer 102 in step 81. In step 83, client computer 102 then produces the blinded function B of the first commitment $c_1$ by blinding a function of [k] and $[c_1]$ using a nonce N. In step 84, client computer 102 computes the second proof of knowledge $\Pi_2$ proving knowledge of the first commitment $c_1$ in both the blinded function B and the third commitment $c_3$ sent in step 66 of FIG. 4A. Client computer 102 sends B and $\Pi_2$ to key server 103 in step 85. Key server 103 verifies the second proof $\Pi_2$ in relation to B and $c_3$ in step 86. If verification fails at decision block 87, then key server 103 aborts in step 88 and operation terminates. If verification of $\Pi_2$ succeeds, then in step 89 key server 103 decrypts the blinded function B, using the private (secret) key esk corresponding to the public key epk, via a decryption algorithm HES.Dec of the encryption scheme HES, obtaining a decrypted value $V=HES.Dec_{esk}(B)$. In step 90, key server 103 generates the blinded key K' from the decrypted value V. Due to the homomorphic property of the encryption scheme, the resulting blinded key K' comprises a blinded function (blinded with the nonce N) of $c_1$ and the server key k introduced via the blinded function B in step 83. This is illustrated in more detail below for an example where the blinded key K' comprises a blinded pseudorandom function (PRF) of $c_1$ and k. Key server 103 sends the blinded key K' to client computer 102 in step 91. Finally, in step 92, client computer 102 obtains the client key K by unblinding the blinded key K' using the nonce N. The resulting client key is thus efficiently derived as deterministic function of the server key k and commitment $c_1$ (and hence vector x of which knowledge has been proved) without the key server learning any information about the vector x or the final client key K.

An exemplary implementation of the above scheme and introduction of preliminary concepts are described in detail below.

Proof Systems (PoK):

PoK{(w): statement(w)} denotes a generic interactive zero-knowledge proof protocol of knowledge of a witness w such that the statement(w) is true. A PoK system fulfils completeness, zero-knowledge and simulation-sound extractability. A PoK system may consist of the two protocols PK.Setup and PK.Prove. On input a security parameter $1^\lambda$, PK.Setup($1^\lambda$) outputs (par$_{PK}$). PK.Prove (par$_{PK'}$) is an interactive protocol between prover and a verifier that statement(w) is true. The additional input the prover holds is the witness w for the statement.

For concrete realizations of PoK's (i.e., generalized Schnorr-signature proofs, see "On the portability of generalized Schnorr proofs", Camenisch et al., EUROCRYPT 2009, volume 5479 of LNCS, pages 425-442 April 2009), notation is used, such as $GSPK\{(a, b, c): y=g^a h^b \wedge \tilde{y} = \tilde{g}^a \tilde{h}^c\}$ as described in "Efficient group signature schemes for large groups" (extended abstract), Camenisch & Stadler, CRYPTO'97, volume 1294 of LNCS, pages 410-424, August 1997.

Commitment Scheme (CS):

A CS with a Pedersen commitment may be instantiated, which satisfies correctness, hiding and binding properties. In addition, the Pedersen commitments are homomorphic. The commitment scheme may be instantiated in a composite order group to be compatible with the other primitives that will be used.

CS.Setup($1^\lambda$): The setup algorithm selects two $\lambda$ bit safe primes p, q such that $\gcd(p-1, q-1, 7)=1$, sets N=pq and sets message space and randomness space as respectively: $\mathcal{M} = \mathbb{Z}_N^*$, $\mathbb{Z} = \mathcal{R}_N^*$. Then, the algorithm picks a prime $\rho$ such that $\rho=2kN+1$ where k is a small prime. Let $G=\langle G \rangle = \langle H \rangle$ be order-N subgroup of the group $\mathbb{Z}_\rho^*$ where G and H are two random generators of G such that $\log_H G$ is unknown. Note that, G is a cyclic subgroup of $\mathbb{Z}_\rho^*$ of order N and all the operations will happen mod $\rho$ (i.e., reduced mod N in the exponent). Finally, the algorithm outputs public parameters par:=($\rho$, N, G, G, H, $\mathcal{M}$, $\mathcal{R}$).

CS.Commit(par, m, r): Compute com$\leftarrow G^m H^r$ mod $\rho$. Output (com, open=r).

CS.Verify(par, com, m, open): Output 1 if com$\leftarrow G^m H^{open}$ mod $\rho$, 0 otherwise.

Pseudorandom Function (PRF):

A PRF scheme may be used, as described in "Efficient oblivious pseudorandom function with applications to adaptive OT and secure computation of set intersection", Jarecki & Liu, TCC 2009, volume 5444 of LNCS, pages 577-594, March 2009, and "Déjà Q: Using dual systems to revisit q-type assumptions", Chase & Meiklejohn, EURO-CRYPT 2014, volume 8441 of LNCS, pages 622-639, May 2014, which is a variant of the PRF scheme of Dodis-Yampolskiy ("A verifiable random function with short proofs and keys", PKC 2005, volume 3386 of LNCS, pages 416-431, January 2005) based on the Boneh-Boyen unpredictable function ("Short signatures without random oracles", EUROCRYPT 2004, volume 3027 of LNCS, pages 56-73, May 2004), instantiated on a composite order group instead of a prime-order group. This PRF was proven to be secure for a domain of arbitrary size based solely on subgroup hiding. The proof for the original PRF instantiated with prime-order groups only allows for a domain which is polynomially-sized in the security parameter. In this embodiment, an arbitrary size domain in order to disallow offline brute-force attack by an honest-but-curious key server. See the PRF definition below.

PRF.Setup($1^\lambda$): On input the security parameter $\lambda$, the setup algorithm selects two $\lambda$ bit safe primes p, q and sets N=pq, then generates groups (N, $\mathbb{G}$, ($\mathbb{G}_1$, $\mathbb{G}_2$))← ($1^\lambda$), where $\mathbb{G}_1$, $\mathbb{G}_2$ are subgroups of $\mathbb{G}$. In one embodiment, candidates for group $\mathbb{G}$ may be composite-order elliptic curve groups without efficient pairings or the target group of a composite-order bilinear group. Finally, the setup algorithm picks g←$\mathbb{G}$, and sets D=K←$\mathbb{Z}_N^*$, R←$\mathbb{G}$, and outputs par=(N, $\mathbb{G}$, g, D, K, R).

PRF. KeyGen($1^\lambda$, par): On input the security parameter and public parameters $\lambda$, par, the key generation algorithm picks k←K and outputs k.

PRF. Evaluate(par, k, m): On input the public parameters par, key k∈K and input m∈D, the evaluation algorithm does the following: if gcd((k+m), N)≠1 then output ⊥ (where ⊥ denotes an error symbol), else output $g^{1/(k+m) \bmod N}$∈R.

Homomorphic Encryption Scheme (HES):

A Projective Paillier Encryption scheme is proposed in "Efficient constructions of composable commitments and zero-knowledge proofs", Dodis, et al., CRYPTO 2008, volume 5157 of LNCS, pages 515-535, August 2008, and "Practical verifiable encryption and decryption of discrete logarithms", Camenisch & Shoup, CRYPTO 2003, volume 2729 of LNCS, pages 126-144, August 2003. This scheme preserves the homomorphic properties of Paillier encryption, but has a dense set of public-keys.

HES. Setup($1^\lambda$): On input the security parameter $\lambda$, the setup algorithm picks two $\lambda$ bit safe primes p, q and sets N=pq. (Such an N may be generated in a distributed fashion, as described in "Efficient computation modulo a shared secret with application to the generation of shared safe-prime products", Algesheimer et al., CRYPTO 2002, volume 2442 of LNCS, pages 417-432, August 2002). Then it generates a random element g∈$(\mathbb{Z}_{N^2})^{2N}$ and sets h:=(1+N mod $N^2$)∈$\mathbb{Z}_{N^2}^*$, a special element of order N. Finally, the algorithm outputs par:=(N,g,h).

HES. KeyGen(par): On input the public parameters par, the key generation algorithm picks a random t∈[N/4] and computes epk←$g^t$ mod $N^2$. Finally, the algorithm outputs (epk, esk:=t).

HES. Enc(epk, m): On input the public key epk and message m, the encryption algorithm picks a random r∈[N/4] and computes u←$g^r$ mod $N^2$; v←$epk^r h^m$ mod $N^2$. Finally, the algorithm outputs cipher-text ct: =(u, v). In some embodiments, [m] is used to mean the encryption of m.

HES. Dec(esk, ct): On input the secret key esk and ciphertext ct, the decryption algorithm computes m'←$v/u^{esk}$ mod $N^2$. If m' is of the form (1+Nm mod $N^2$) for some n∈[N], output m. Else output ⊥.

Collision Resistant Hash Function (CRHF):

A family of functions $\mathcal{H}$ is collision resistant if no efficient algorithm may find, on input a random H∈$\mathcal{H}$, two different inputs x≠y such that H(x)=H(y) (except with probability negligible in the security parameter). The CRHF may be implemented, as described in "Bivariate polynomials modulo composites and their applications", Boneh & Corrigan-Gibbs, ASIACRYPT 2014, Part I, volume 8873 of LNCS, pages 42-62, December 2014.

Merkle Hash Tree (MHT):

A Merkle hash tree (see "A certified digital signature", Merkle, CRYPTO'89, volume 435 of LNCS, pages 218-238, August 1990) provides a succinct commitment to a vector, such that it is later possible to open and verify individual values in the vector without opening the entire vector. Given a vector x=($x_1$, . . . , $x_n$), a MHT is constructed on it as follows: group the values in pairs and then use a CRHF to hash each pair. The hash values are then again grouped in pairs and each pair is further hashed, and this process is repeated until only a single hash value remains. This results in a binary tree with the leaves corresponding to the blocks of the vector and the root corresponding to the last remaining hash value. The root serves as the commitment to x and later individual positions may be opened such that the opening may be verified against the root.

Vector Commitments (VC):

Vector commitments (see "Vector commitments and their applications", Catalano & Fiore, PKC 2013, volume 7778 of LNCS, pages 55-72, 2013) allow one to commit to a vector of messages in such a way that it is later possible to open the commitment to one of the messages (i.e., provide a witness that proves that $x_i$ is indeed the $i^{th}$ value in the committed vector x). The size of the commitment and the opening are independent of the length of the vector. In this embodiment, the efficiency requirement is modified by VC. For example, let n be the length of the committed vector. Accordingly, the size of the commitment may be required to be independent from n, but the size of the opening should be less than n, i.e., o(n). A VC may either be non-hiding (NHVC) or hiding (HVC). For a NHVC the security requirement is binding. Stated differently, this property requires that once an adversary comes up with a VC, it may not be able to prove two different values with respect to the same position for that VC. For a HVC, the hiding is an additional security requirement. Stated differently, this requirement states that the VC should conceal the committed vector (i.e., an adversary should not be able to distinguish if a VC was created for a vector x or a vector y, where x≠y). Hiding may be defined as for standard commitment.

Most of the inputs to the algorithms are common for a HVC and a NHVC. The inputs that may be needed exclusively for a HVC are discussed in greater detail below.

VC.Setup($1^\lambda$, n): On input the security parameter $1^\lambda$ and an upper bound n on the size of the vector, generate the parameters of commitment scheme par, which include a description of message space $\mathcal{M}$ and a description of randomness space $\mathcal{R}$.

VC.Commit(par, x): On input public parameters par and a vector x∈$\mathcal{M}^l$ (l≤n), the algorithm outputs a commitment com to x.

VC.Prove(par, i, x): On input public parameters par, a position index i, and a vector x, the algorithm generates a witness w for $x_i$ and outputs (w, $x_i$).

VC.Verify(par, i, com, w, x): On input public parameters par, a position index i, a commitment com and witness w for x, the algorithm outputs 1 if w is a valid witness for x being at position i, and 0 otherwise.

Below two algorithms are defined (VC.RandCommitment, VC. RandWitness). VC.RandCommitment may allow to update a NHVC to a HVC one and VC. RandWitness may allow to update a NHVC witness to a HVC one.

VC.RandCommitment(par, com, r): On input public parameters par, a non-hiding commitment com and r∈$\mathcal{R}$, outputs a HVC com'.

VC.RandWitness (par, com, i, r, w): On input public parameters par, a NHVC witness w, a non-hiding commitment com and r∈$\mathcal{R}$, outputs a HVC witness w'.

Protocol:

The protocol is designed in the trusted CRS (Common Reference String) model, such that each party, key server 103 (KS) and client computer 102 ($C_i$), receives the public parameters of the scheme from a trusted party. Key server 103 additionally picks a key for a PRF.

The protocol has two major building blocks, namely VC and a PRF. In this embodiment, the client key that the KS will generate for $C_i$'s input file are: (1) the key should be random, and hence difficult to guess by an adversary, but (2) it should be unique for a file (i.e., the KS should be able to generate the same key for the same file), in spite of being stateless, and (3) the key should not be publicly computable (i.e., only the KS in possession of secret information should be able to compute a key for a file). All these properties are provided here by making the client key a PRF evaluation on a succinct non-hiding and binding commitment to the vector x. This short commitment is denoted by s.

The PRF evaluation may be carried out obliviously, since the KS should not learn information about $C_i$'s input. In this embodiment, the oblivious PRF evaluation protocol between KS (holding k) and $C_i$ (holding s) for the PRF described above. Furthermore, this portion of the protocol may leverage the homomorphic encryption scheme HES described above. In one embodiment, $C_i$ may be malicious. Accordingly, it may be beneficial to ensure that $C_i$ commits to its input s and proves knowledge of its opening (PoK $\Pi_2$) before the KS engages in computing the PRF.

The properties of VC are leveraged to allow the client to prove knowledge of the preimage of s efficiently. A VC lets $C_i$ prove knowledge of some random positions of the preimage. In this embodiment, this property is utilized by allowing the KS challenge $C_i$ to prove knowledge of t random positions of its input, where t may be much less than the length n of x. A decision on the value of t depends on the soundness error that may be accepted for a given protocol.
Construction:

Setup: On input of a Setup request Setup and setup id sid for the specific invocation of Setup, the KS executes:
1. Receive (par) from the trusted source where par=($par_{PRF}$, $par_{VC}$, $par_{CS}$, $par_{PK}$, $par_{HES}$) i.e. the par for PRF.Setup, VC.Setup, CS.Setup, PK.Setup, and HES. Setup above. (In these selected schemes, these all work in the same setting with shared parameters. To simplify the notation, when the primitive used is clear from the context, par may be referred to, and not to the specific parameters of that primitive.)
2. Run k←PRF. KeyGen($1^\lambda$, par) and store k.
3. Output (Setup, sid).

Evaluate: On input (Evaluate, sid, qid, x=($x_1$, . . . , $x_n$)∈par. $\mathcal{M}^n$) at $C_i$ (where qid is a query identifier for the specific invocation of Evaluate), the following protocol is executed between $C_i$ and KS.
1. Receive (par)=($par_{PRF}$, $par_{VC}$, $par_{CS}$, $par_{PK}$, $par_{HES}$) from the trusted source.
2. $C_i$ picks a random $r_1$←par. $\mathcal{R}$ and computes s←VC.Commit(par, x) and s'←VC.RandCommitment(par, s, $r_1$). Additionally, $C_i$ does the following:
   (a) Pick a random $r_2$←par. $\mathcal{R}$
   (b) Compute com←CS.Commit(par, s, $r_2$).
   (c) Then $C_i$ generates the following proof of knowledge $$\Pi_{s1} := PoK\{(s, r_2): com = CS.Commit(par, s, r_2)\}$$

(d) Additionally, $C_i$ computes the following proof of knowledge $$\prod_{s2} := PoK\left\{ \begin{array}{l} (s, r_1, r_2): com = CS \cdot Commit(par, s, r_2) \wedge \\ s' = VC \cdot RandCommitment(par, s, r_1) \end{array} \right\}$$

and sends (s', com, $\Pi_{s1}$, $\Pi_{s2}$) to KS.

3. KS verifies $\Pi_{s1}$ and $\Pi_{s2}$. If the verifications succeed, then KS proceeds to the next step.
4. KS picks a subset I=, $\{j_1, \ldots, j_t\}$ of indices from [1, n] randomly and sends I to $C_i$.
5. For each challenged index j∈I, $C_i$ computes $$(w_j, x_j) \leftarrow VC.Prove(par, j, x)$$

$$(w'_j) \leftarrow VC.RandWitness(par, s, j, r_1, w_j)$$

and generates the following proof of knowledge $$\pi_j = PoK\{(w'_j, x_j): 1 = VC.Verify(par, j, s', w'_j, x_j)\}$$

Let $\Pi_{s3} = \{\pi_j | j \in I\}$. $C_i$ sends $\Pi_{s3}$ back to KS.
6. KS verifies $\Pi_{s3}$ and if verification succeeds, KS proceeds to the next step.
7. KS picks(epk, esk)←HES. KeyGen(par), computes [k]←HES.Enc(epk, k) and sends (epk, [k]) to $C_i$.
8. Then $C_i$ picks $r_3$←par.$\mathcal{R}$ and computes $$ct \leftarrow ([k][s])^{r_3},$$

where [s]←HES.Enc(epk, s)
9. Next, $C_i$ generates the following proof of knowledge $$\prod_{2} := PoK\left\{ \begin{array}{l} (s, r_2, r_3): com = CS \cdot Commit(par, s, r_2) \wedge \\ ct \leftarrow ([k][s])^{r_3} \end{array} \right\}$$

$C_i$ sends (ct, $\Pi_2$) to KS.
10. KS verifies $\Pi_2$ and if verification succeeds, KS continues.
11. KS computes V←HES. Dec(esk, ct)
12. Then KS computes K'←$g^{1/v}$ and sends K' to $C_i$.
13. If K'=⊥, output ⊥. Otherwise compute K=K'$^{(r_3 \bmod par.N)}$ and output K. (The randomness $r_3$ cancels out here with algebraic PRFs with appropriate codomains as chosen in this construction).

In the above construction, commitments s, s' and com correspond respectively to the first, second and third commitments $c_1$, $c_2$ and $c_1$ in FIGS. 4A and 4B, and the random value $r_3$ corresponds to the nonce N in these figures. The second sub-proof $\Pi_{s2}$ proves that $c_2$ and $c_3$ are computed from a common value, being $c_1$. The homomorphic encryption scheme HES here is an additively homomorphic scheme whereby, if $C_1$=HES.Enc$_{epk}$($m_1$) and $C_2$=HES.Enc$_{epk}$($m_2$), then $C_1 \odot C_2$=HES.Enc$_{epk}$($m_1+m_2$), and (HES. Enc$_{epk}$(m))$^r$=HES.Enc$_{epk}$(r·m), where ⊙ corresponds to multiplication here. Hence, in step 8:

$$ct \leftarrow ([k][s])^{r_3} = HES.Enc_{epk}(r_3(k+s))$$

whereby, in step 11, V=$r_3$ (k+s). In step 12, K'=$g^{1/r_3(k+s)}$, whereby K=K'$^{r_3}$=$g^{1/(k+s)}$ in step 13, corresponding to the PRF defined earlier. Key server 103 learns nothing about the vector x or the final client key K, and the client gains no information on the server key k.

The parameter t is a tuning parameter that trades communication bandwidth for efficiency. This parameter may be set as desired to give a desired degree of confidence that the prover (i.e., the client) owns the entire file. To minimize soundness error, a client file F may be erasure coded first and the vector x defined by partitioning the erasure coded file into n blocks. If the erasure code is resilient to erasure of up to α fraction of the bits and ∈ is the desired soundness bound, then t may be picked as the smallest integer such that $(1-\alpha)^t < \in$.

Two examples of vector commitment schemes for use in embodiments based on the above construction are as follows.

Merkle Tree-Based Vector Commitment:

This VC scheme is based on the accumulator construction presented in "Bivariate polynomials modulo composites and their applications", Boneh et al., ASIACRYPT 2014, Part I, volume 8873 of LNCS, pages 42-62, December 2014. In one embodiment, the same Merkle Hash Tree (MHT) may be used, based construction but it may not be necessary to hide the index position of the leaf, giving an efficiency enhancement.

VC.Setup($1^\lambda$, n): On input security parameter $1^\lambda$ and an upper bound n, the algorithm invokes CS.Setup($1^\lambda$). Let CS.Setup($1^\lambda$) return ($\rho$, N, G, G, H, $\mathcal{M}$, $\mathcal{R}$). This algorithm appends the tuple with the collision resistant hash function H: $(\mathbb{Z}_N)^2 \to \mathbb{Z}_N$ defined as: $H(x,y)=x^7+3y^7 \mod N$ and returns it as par.

VC.Commit(par,x): On input public parameters par and input $x=(x_1, \ldots, x_n)$, the algorithm, using $H(\cdot, \cdot)$, recursively builds a Merkle Hash Tree on x. (If n is not a power of two, insert "dummy" elements into x until n is a perfect power of 2.) Let MR be the root of the MHT. The algorithm outputs commitment com=MR.

VC.Prove(par, i, x): On input public parameters par, position index i and input $x=(x_1, \ldots, x_n)$, the algorithm does the following. Let us denote the node values along the path from the root node with value MR, to the leaf node, with value x[i], in the MHT as $\mathcal{P} = (p_0, p_1, \ldots, p_d)$. Note that $p_0$=MR and $p_d$=x[i]. Let $\mathcal{P}_S = (p'_1, \ldots, p'_d)$ be the sibling path of $\mathcal{P}$ (note that $p_0$ has no sibling). Then, the algorithm computes $\mathcal{P}_S$ and outputs witness $(w = \mathcal{P}_S, x_i)$.

VC.Verify(par, i, com, w, x): On input public parameters par, position index i, commitment com=MR, and witness (w,x) the algorithm parses w as $\mathcal{P}_S = (p'_1, \ldots, p'_d)$ and sets $p_d$=x. For each j=d, ..., 1, the algorithm recursively computes the internal nodes by hashing the left and right child. Let $p_0 = H(p_1, p'_1)$ (if $p_1$ is the left sibling, $H(p'_1, p_1)$ otherwise). This algorithm checks if MR=$p_0$. It outputs 1 if the equality holds, 0 otherwise. For a NHVC realization, w has to be parsed as ($\mathcal{P}_S = (p'_1, \ldots, p'_d)$, com$_{MR}$, open$_{MR}$). The rest of the steps remain the same. In the last step, instead of checking if MR=$p_0$, the algorithm will check if CS.Verify(par, com$_{MR}$, MR, open$_{MR}$)=1. The algorithm will output 1 if the equality holds, 0 otherwise.

VC.RandCommitment(par, com, r): On input public parameters par, non-hiding vector commitment com=MR and randomness $r \in \mathcal{R}$, the algorithm invokes CS.Commit(par, MR, r). Let CS.Commit(par, MR, r) return (com$_{MR}$, open$_{MR}$). Output com'=com$_{MR}$.

VC.RandWitness (par, com, i, r, w): On input public parameters par, non-hiding vector commitment com=MR, position i, randomness $r \in \mathcal{R}$, and partial witness w, the algorithm parses w as $\mathcal{P}_S = (p'_1, \ldots, p'_d)$, appends w with (com$_{MR}$, open$_{MR}$) where (com$_{MR}$, open$_{MR}$)=CS.Commit(par, MR, r), and outputs $w' = (\mathcal{P}_S, \text{com}_{MR}, \text{open}_{MR})$.

Proofs of Knowledge for Merkle Tree-Based Vector Commitment:

In this embodiment, three accompanying PoK's may be required to be implemented efficiently. Full implementations of all PoK's are described in greater detail below. Described herein are proofs may be avoided for this VC instantiation and which need more care. Note that, VC.RandCommitment is the same as the CS.Commit algorithm, which computes a Pedersen commitment to the NHVC, MR. So, $\Pi_{s2}$ will be just a standard proof of equality. In fact, the following optimisation may be done: use s' as com throughout the protocol and skip $\Pi_{s2}$. For the proofs $\pi_j$:

$$PoK\{(w',x):1=\text{HVC.Verify}(par,j,\text{com},w',x)\},$$

proving these relations is more involved and requires the following steps.

1. The algorithm parses w' as ($\mathcal{P}_S = (p'_1, \ldots, p'_d)$, com$_{MR}$, open$_{MR}$).

2. The node values along the path from the root node with value MR are denoted, to the leaf node, with value $x_j$, in the MHT as $\mathcal{P} = (p_0, p_1, \ldots, p_d)$. The algorithm recovers this path recursively bottom up using $H(\cdot, \cdot)$ on $\mathcal{P}_S$. The index position j uniquely decides the left and the right child at each step.

3. Then, the algorithm commits to every value $p_j$ in this path and to the values of the left and right children of $p_j$ in the MHT, i.e., if $l_j$ is the left child and $r_j$ is the right, then the algorithm computes $$(P_j, s_j) \leftarrow \text{CS.Commit}(par, p_j, s_j),$$

$$(L_j, s'_j) \leftarrow \text{CS.Commit}(par, l_j, s'_j),$$

$$(R_j, s''_j) \leftarrow \text{CS.Commit}(par, r_j, s''_j).$$

4. Then, the algorithm generates a proof that $P_0$ is indeed a commitment to the root (the open in the output is ignored of CS.Commit for sake of clarity):

$$PoK_{MR}\left\{\begin{array}{c}(MR, r, s): com = CS \cdot Commit(par, MR, r) \wedge \\ P_0 = CS \cdot Commit(par, MR, s)\end{array}\right\}$$

5. Next, for j=0, ..., d-1, the following proof of knowledge proves that each triplet $(P_j, L_j, R_j)$ is well formed. Note that $L_j$ (or $R_j$) is used as $P_{j+1}$.

$$PoK_j\left\{\begin{array}{c}(l, r, s, s', s''): P_j = CS \cdot Commit(par, l^7 + 3r^7, s) \wedge \\ L_j = CS \cdot Commit(par, l, s') \wedge \\ R_j = CS \cdot Commit(par, r, s'')\end{array}\right\}$$

This proof requires the following sub-steps.

(a) This proof uses the homomorphic property of the Pedersen commitment scheme and a sub-protocol for PoK$_{mult}$ for multiplication of two values. This protocol is instantiated using standard techniques and that is succinctly represented by PoK$_{mult}$ as follows:

$$PoK_{mult}\left\{\begin{array}{c}(x, t, z, s_x, s_y, s_z): C_x = CS \cdot Commit(par, x, s_x) \wedge \\ C_y = CS \cdot Commit(par, y, s_y) \wedge \\ C_z = CS \cdot Commit(par, c_z, s_z) \wedge \\ z = x \cdot y\end{array}\right\}$$

(b) The prover computes $C_l$, $C_{l^2}$, $C_{l^4}$, $C_{l^6}$, $C_{l^7}$, and $C_r$, $C_{r^2}$, $C_{r^4}$, $C_{r^6}$, $C_{r^7}$.

(c) The prover invokes PoK$_{mult}$ on each of the following triplets to prove correctness of the commitments: $(C_l, C_l, C_{l^2})$, $(C_{l^2}, C_{l^2}, C_{l^4})$, $(C_{l^2}, C_{l^4}, C_{l^6})$, $(C_l, C_{l^6}, C_{l^7})$, $(C_r, C_r, C_{r^2})$, $(C_{r^2}, C_{r^2}, C_{r^4})$, $(C_r, C_{r^4}, C_{r^6})$, $(C_r, C_{r^6}, C_{r^7})$.

(d) The verifier may compute $C_{l^7+3r^7}$ using $C_{l^7}$ and $C_{r^7}$ as $C_{l^7+3r^7} \leftarrow C_{l^7} \cdot (C_{r^7})^3$ (using the homomorphism).

(e) The prover sends all these commitments and PoK$_{mult}$'s to the verifier.

6. Let d=log n be the depth of the MHT. The complete proof consists of the set of commitments $\{(P_j, L_j, R_j)\}_{j=0}^d$, the 10d auxiliary commitments in the previous sub-step and 8d+1 PoK's. The total size of the proof is O(d)=O(log n). Note that the 10 commitments and 8 $PoK_{mult}$'s per $PoK_j$ are absorbed in the notation $PoK_j$.

RSA-Based Vector Commitment:

This scheme is based on the RSA based non-hiding VC scheme presented in "Vector commitments and their applications", Catalano et al., PKC 2013, volume 7778 of LNCS, pp. 55-72, 2013, with two main changes: (1) the commitment scheme is configured to hide and (2) a PoK is added to prove $i^{th}$ index instead of providing the value and the witness directly.

VC.Setup($1^\lambda$, n): On input security parameter $1^\lambda$ and an upper bound n, the algorithm does the following:

1. Pick two $\lambda$ bit safe primes p=2p'+1 and q=2q'+1 q and set N=pq.
2. Pick l=poly($\lambda$) to be the upper bound on the length of the messages.
3. Choose n, $l+161^8$ bit primes $e_1, \ldots, e_n$ that do not divide $\phi(N)$.
4. Pick a random $b \leftarrow \mathbb{Z}_N^*$.
5. For j=1 to n, compute $K_j \leftarrow b^{\Pi_{i=1, i \neq j} e_i^n} \mod N$.
6. Set $K_0 \leftarrow b^{\Pi_{i=1} e_i^n} \mod N$.
7. Output the parameters par:=(N, b, $e_1, \ldots, e_n$, $K_0, \ldots, K_n$, $\mathcal{M} = \{0,1\}^l$, $\mathcal{R} = \mathbb{Z}_N^*$)

VC.Commit(par, x): On input public parameters par and input $x=(x_1, \ldots, x_n)$, the algorithm computes com$\leftarrow K_1^{x_1} \ldots K_n^{x_n} \mod N$ and outputs commitment com.

VC.Prove(par, i, x): On input public parameters par, a position i, and $x=(x_1, \ldots, x_n)$, the algorithm computes $w \leftarrow (\Pi_{j=1, j \neq i}^N \ldots K_j^{x[j]})^{1/e_i} \mod N$ outputs witness (w, $x_i$).

VC.Verify(par, i, com, w,x): On input public parameters par, position i, a commitment com and witness (w,x), the algorithm outputs 1 if $K_i^x w^{e_i} \mod N=$com and $x \in M$, 0 otherwise. The verification algorithm is the same for both HVC and NHVC except that, instead of com, the algorithm will take com' as input.

VC.RandCommitment (par, com, r): On input public parameters par, non-hiding vector commitment com and randomness $r \in R$, the algorithm computes com'$\leftarrow$com$\cdot K_0^r$ mod N and outputs com'.

VC.RandWitness (par, com, i, r, w): On input public parameters par, non-hiding vector commitment com, position i, randomness $r \in R$ and partial witness w, the algorithm computes $w' \leftarrow w \cdot (b^{\Pi_{j=1, j \neq i} e_j})^r = w \cdot K_0^{r/e_i} \mod N$ and outputs w'.

The following gives the concrete implementations of the PoK protocols used above. The CRS contains the public key of the CPA version of the Camenisch-Shoup encryption scheme ("Practical verifiable encryption and decryption of discrete logarithms", referenced earlier). In this embodiment, the modulus N in the CRS is acquired where N is a product of two safe primes which may be generated in a distributed fashion. Let g' and y' be random elements of $\mathbb{Z}_{N^2}^*$ contained in the CRS and set $g=g'^{2N}$, $y=y'^{2N}$, and $h=1+N \mod N^2$. First, implementations of the PoK's are described that are common to both the VC instantiations above, and then give implementations specific to each VC. As is well known in the art, all PoK's may be executed as interactive or non-interactive proofs as desired.

PoK's Common to Both VC Schemes:

$\Pi_{s1}:=PoK\{(s,r):com=CS.Commit(par, s, r)\}$

This is done by first computing $E_s=(g^{r_1} \mod N^2, h^s y^{r_1} \mod N^2)$, $E_r=(g^{r_2} \mod N^2, h^r y^{r_2} \mod N^2)$, with $r_1$ and $r_2$ being randomly drawn from [N/4], sending these values to the verifier, and then executing the following proof with the verifier:

$GSPK\{(s,r,r_1,r_2):com=G^s H^r \wedge E_s=(g^{r_1}, h^s y^{r_1}) \wedge E_r=(g^{r_2}, h^r y^{r_2})\}$ where mod $\rho$ and mod $N^2$ are omitted for brevity.

$$\prod_{2} := PoK\left\{\begin{array}{c}(s, r_2, r_3): com = CS \cdot Commit(par, s, r_2) \wedge \\ ct \leftarrow ([k][s])^{r_3}\end{array}\right\}$$

is executed as follows. Let us denote [k]=($e_1, e_2$). The prover first computes $E_r=(g^{u_r} \mod N^2, h^{r_3} y^{u_r} \mod N^2)$, where $u_r$ is randomly drawn from [N/4], send these values to the verifier, and executes the following proof protocol with the verifier:

$GSPK\{(s,r_2,r_3,w,r):com=G^s H^{r_2} \wedge 1=com^{-r_3} G^w H^r \wedge ct= (e_1^{r_3} epk^B h^w, e_2^{r_3} g^B) \wedge E_r=(g^{u_r}, h^{r_3} y^{u_r})\}$ Here the term $1=com^{-r_3}G^w H^r$ shows that $w=sr_3$ and hence that $ct=([k][s])^{r_3}$ with B being the value that the prover used to randomize the encryption.

PoKs for the MHT-VC:

These proofs implement $\Pi_{s3}$ ($\Pi_{s2}$ may be omitted here as explained above).

$PoK_{MR}\{(MR,r,s):com=CSCommit(par, MR,r) \wedge P_0=CSCommit(par,MR,s)\}$ is done by first computing $E_{MR}=(g^{r_1} \mod N^2, h^{MR} y^{r_1} \mod N^2)$, $E_r=(g^{r_2} \mod N^2, h^r y^{r_2} \mod N^2)$ and $E_s=(g^{r_3} \mod N^2, h^s y^{r_3} \mod N^2)$ with $r_1$, $r_2$ and $r_3$ randomly drawn from [N/4], sending these values to the verifier, and then executing the following proof protocol with the verifier:

$GSPK\{(MR,r,s,r_1,r_2,r_3): com=G^{MR} H^r \wedge P_0=G^{MR} H^s \wedge E_{MR}= (g^{r_1}, h^{MR} y^{r_1}) \wedge E_r=(g^{r_2}, h^r y^{r_2}) \wedge_s=(g^{r_3}, h^s y^{r_3})\},$ where mod $\rho$ and mod $N^2$ are omitted for brevity.

$PoK_{mult}\{(x,y,z,s_x,s_y,s_z):C_x=CSCommit (par,x,s_x) \wedge C_y=CSCommit(par, y,s_y) \wedge C_z=CSCommit(par,c_z,s_z) \wedge z=x \cdot y\}$ is done by first computing $E_x=(g^{u_1} \mod N^2, h^x y^{u_1} \mod N^2)$, and $E_y=(g^{u_2} \mod N^2, h^y y^{u_2} \mod N^2)$ with $r_1$ and $r_2$ being randomly drawn from [N/4], sending these values to the verifier, and then executing the following proof protocol with the verifier:

$GSPK\{(x,y,z,s_x,s_y,s_z,s',u_1,u_2): C_x=G^x H^{s_x} \wedge C_y=G^y H^{s_y} \wedge C_z=G^z H^{s_z} \wedge C_z=C_y^x H^{s'} \wedge E_x=(g^{u_1}, h^x y^{u_1}) \wedge E_y=(g^{u_2 1}, h^y y^{u_2})\}.$ In one embodiment, there may be no need to verifiably encrypt the witness z as this may be computed from x and y. Similarly, a number of encryptions may be dropped when combining these proofs in the bigger proof of the hash-tree path.

PoKs for the RSA-VC:

$$\prod_{s_2} := PoK\left\{\begin{array}{c}(s, r_1, r_2): com_s = CS \cdot Commit(par, s, r_2) \wedge \\ s' = VC \cdot RandCommitment(par, s, r_1)\end{array}\right\}$$

This statement proves that s' is a randomized version of the vector commitments to which in turn $com_s$ commits. In other words, that $s'=sK_0^{r_0}$ holds for some value of $r_0$ and for the s committed in $com_s$. This statement may be proved by the following proof protocol $$GSPK_{01}\{(r'_1,r'_2): G^{s'}=com_s^{K_0^{r'_1}}H^{r'_2} \bmod \rho\}.$$

Here $r'_2$ absorbs the randomness $-r_2 K_0^{r_1}$, i.e. $r'_2=-r_2 K_0^{r_1}$, but there may be no need to prove anything about $r'_2$. This protocol works with binary challenges as it involved a "double discrete logarithm" relation (thus suffix 01 for $GSPK_{01}$).

$$\pi_j = PoK\{(w,x):1=VC.Verify(par,com',j,x,w)\}$$

For this proof, the CRS may be required to contain elements $z_1$, $z_2$, and $z_3$ from $\mathbb{Z}_N^*$ of order p'q' so that that w may be verifiably ElGamal-encrypted with respect to $z_1$, and to do range proofs for w with respect to $z_2$ and $z_3$. Thus, the prover first computes $E_1=wz_1^r \bmod N$, $E_2=wz_2^r \bmod N$, $E'=z_2^x z_3^r \bmod N$, and $E_x=(g^{u_x} \bmod N^2, h^x y^{u_x} \bmod N^2)$, where $u_x$ and r are randomly drawn from [N/4], sends $E_1$, $E_2$, $E'$ and $E_x$ to the verifier, and executes the following proof with the verifier:

$$GSPK\{(x,w,r):com'/E_1^{e_j}=K_i^x)(z_1^{-e_j})^r \land E_2=z_2^r \land E_x=(g^{u_x},h^x y^{u_x}) \land E'=z_2^x z_3^r \land x \in [-2^{l+160},2^{l+160}])\}.$$

This proofs shows that $e_1/z_1^r$ is a witness for x and that x is in the required range.

It will be seen that the above embodiments permit exceptionally secure and efficient generation of client keys which are suitable for deduplication applications and which may only be obtained by clients in possession of the file from which the key is generated. It will be understood, however, that the key generation procedures described may be applied in any application requiring oblivious generation of a key which is deterministically derived from data of which the client proves knowledge to obtain the key.

Many other changes and modifications may be made to the exemplary embodiments described. For example, while file-level deduplication by storage server 4 is described above, the deduplication granularity may be a data block, object, or any other data unit in other embodiments. Also, since key server 103 learns nothing in its interaction with the client, it would be possible to merge the functionality of the key server 103 and storage server 104 in some embodiments. Implementation of the servers 103 and 104 as separate entities is preferred, however, for the additional protection afforded against offline brute-force attacks.

While particularly efficient implementations have been described, other schemes may be envisaged for oblivious key-generation in the key-generation protocol and for construction of the various proofs.

In general, steps of flow charts may be performed in a different order to that shown, and some steps may be performed concurrently as appropriate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 5:
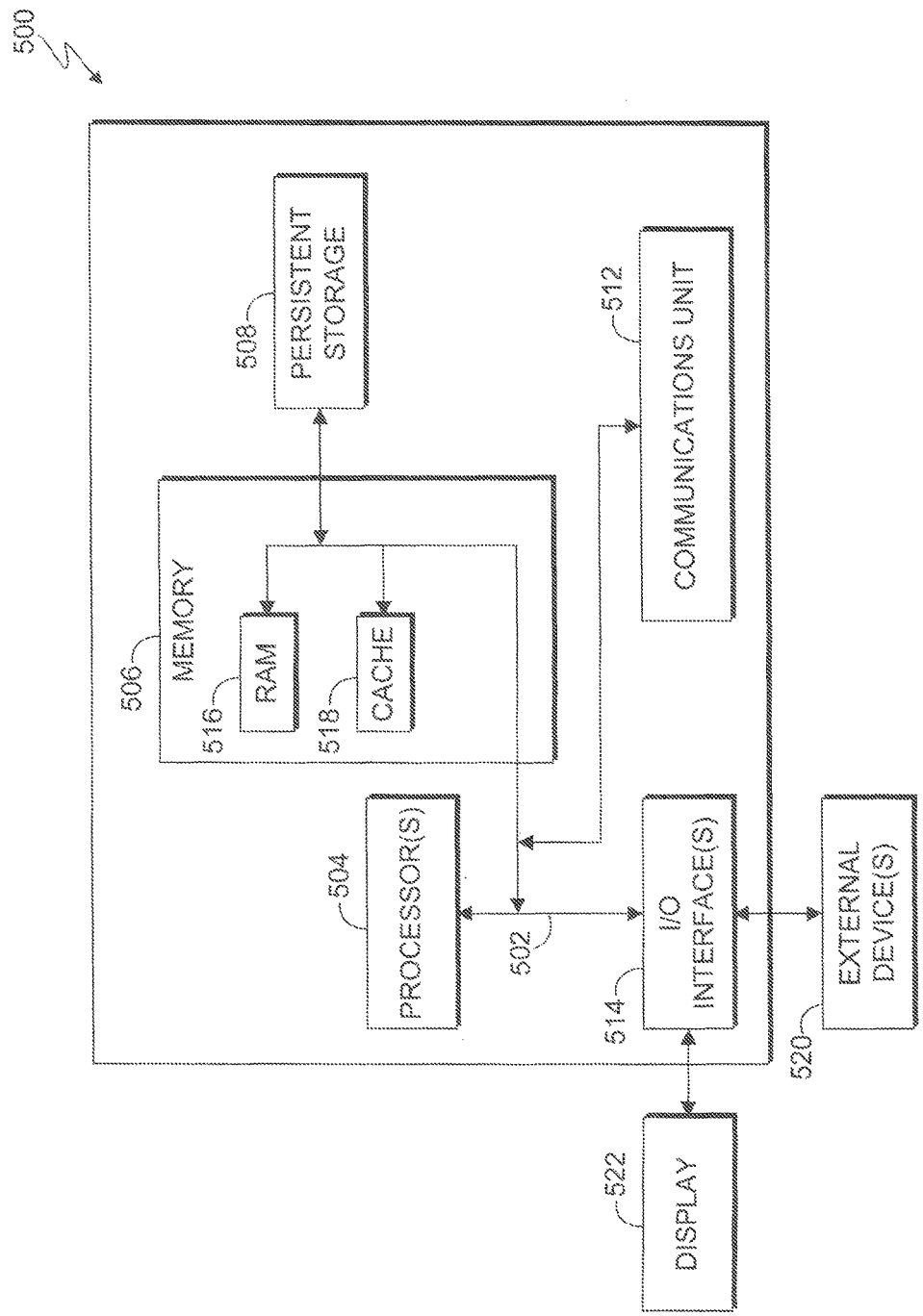
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 may be implemented with any architecture designed for passing data and/or control information between processors (such as microprocessors, communications and network processors, etc.), system memory, peripheral devices, and any other hardware components within a system. For example, communications fabric 502 may be implemented with one or more buses.

Memory 506 and persistent storage 508 are computer-readable storage media. In this embodiment, memory 506 includes random access memory (RAM) 516 and cache memory 518. In general, memory 506 may include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 may include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 105). In this exemplary embodiment, communications unit 512 includes network adapters or interfaces such as a TCP/IP adapter cards, wireless Wi-Fi interface cards, or 3G or 4G wireless interface cards or other wired or wireless communication links. The network may comprise, for example, copper wires, optical fibers, wireless transmission, routers, firewalls, switches, gateway computers and/or edge servers. Software and data used to practice embodiments of the present invention may be downloaded through communications unit 512 (e.g., via the Internet, a local area network or other wide area network). From communications unit 512, the software and data may be loaded onto persistent storage 508.

One or more I/O interfaces 514 allow for input and output of data with other devices that may be connected to computer system 500. For example, I/O interface 514 may provide a connection to one or more external devices 520, such as a keyboard, computer mouse, touch screen, virtual keyboard, touch pad, pointing device, or other human interface devices. External devices 520 may also include portable computer-readable storage media such as, for example, thumb drives, portable optical or magnetic disks, and memory cards. I/O interface 414 also connects to display 522.

Display 522 provides a mechanism to display data to a user and may be, for example, a computer monitor. Display 522 may also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
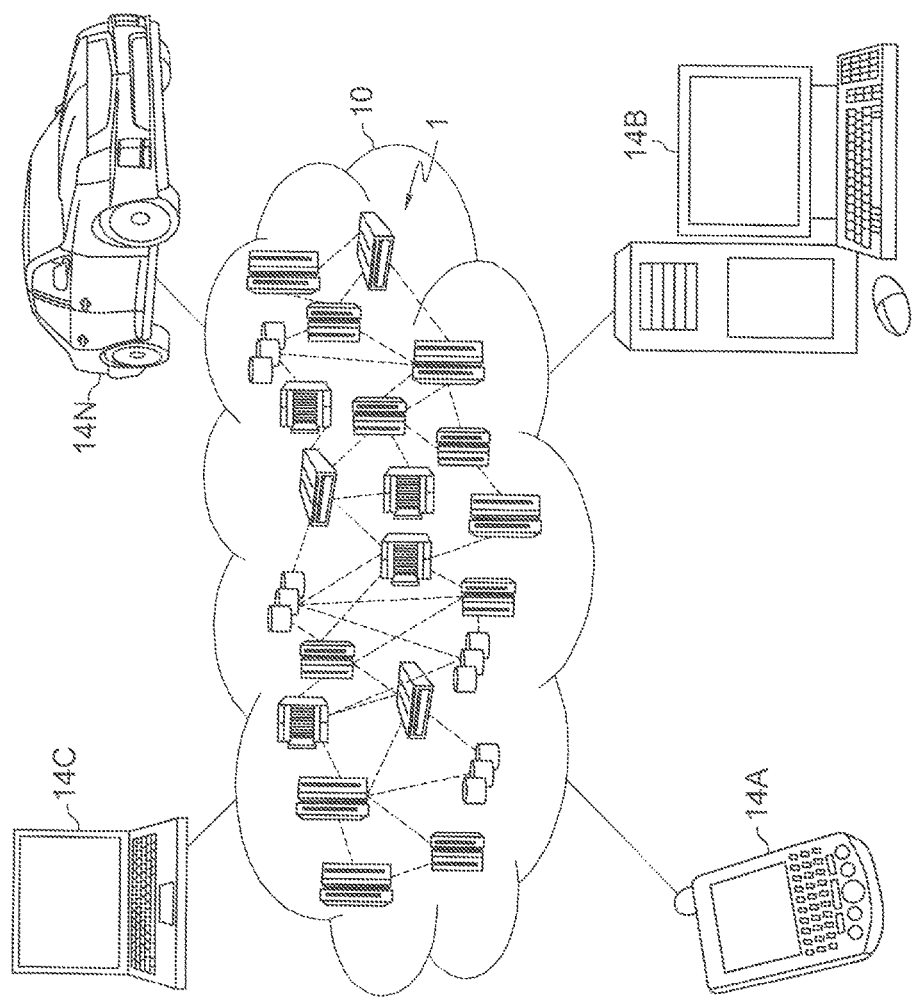
FIG. 6 is a block diagram of a cloud computing environment, in accordance with an embodiment of the present invention.

Referring now to FIG. 6, illustrative cloud computing environment 10 is depicted. As shown, cloud computing environment 10 includes one or more cloud computing nodes 1 with which local computing devices used by cloud consumers, such as, for example, personal digital assistant (PDA) or cellular telephone 14A, desktop computer 14B, laptop computer 14C, and/or automobile computer system 14N may communicate. Nodes 1 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 14A-N shown in FIG. 6 are intended to be illustrative only and that computing nodes 1 and cloud computing environment 10 may communicate with any type of computerized device over any type of network and/or network addressable connection (e.g., using a web browser).

Figure 7:
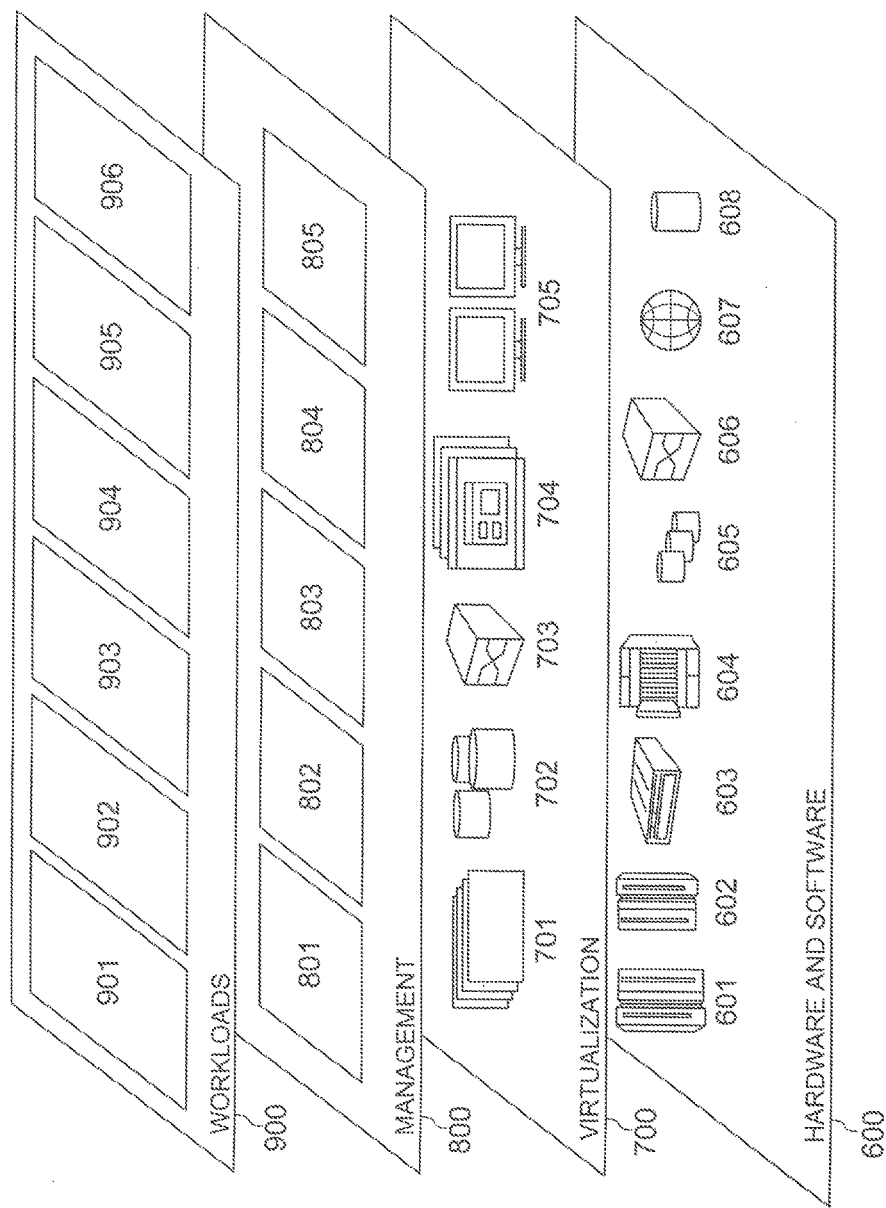
FIG. 7 is a block diagram of abstraction model layers, in accordance with an embodiment of the present invention.

Referring now to FIG. 7, a set of functional abstraction layers provided by cloud computing environment 10 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 700 provides an abstraction layer from which the following examples of virtual entities may be provided: virtual servers 701; virtual storage 702; virtual networks 703, including virtual private networks; virtual applications and operating systems 704; and virtual clients 705.

In one example, management layer 800 may provide the functions described below. Resource provisioning 801 provides dynamic procurement of computing resources and other resources that are utilized to perform tasks within the cloud computing environment. Metering and Pricing 802 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 803 provides access to the cloud computing environment for consumers and system administrators. Service level management 804 provides cloud computing resource allocation and management such that required service levels are met. Service Level Agreement (SLA) planning and fulfillment 805 provide pre-arrangement for, and procurement of, cloud computing resources for which a future requirement is anticipated in accordance with an SLA.

Workloads layer 900 provides examples of functionality for which the cloud computing environment may be utilized. Examples of workloads and functions which may be provided from this layer include: mapping and navigation 901; software development and lifecycle management 902; virtual classroom education delivery 903; data analytics processing 904; transaction processing 905; and system 906.

What is claimed is:

1. A system comprising:
a client computer for providing client data, wherein the client computer configured to:
define a vector x, comprising a plurality n of data blocks $x_i$ with indices i=1 to n, corresponding to the client data;
generate a first commitment, wherein the first commitment is a non-hiding vector commitment, to the vector x;
generate a second commitment, wherein the second commitment is a hiding vector commitment, to the vector x;
generate a third commitment to the first commitment;
send the second commitment and the third commitment to the key server;
provide to the key server a first proof of knowledge, for a subset of the indices i, of the corresponding data blocks $x_i$ of the vector x in the second commitment and the third commitment;
a key server for communicating over a network, wherein the key server is configured to:
store a secret server key k;
responsive to verifying the first proof, engage with the client computer in a key-generation protocol, wherein the client computer during the engagement is configured to:
send to the key server a blinded function of the first commitment and provide to the key server a second proof of knowledge of the first commitment in the blinded function and in the third commitment;
wherein the key server during the engagement is configured to:
responsive to verifying the second proof, generate from the blinded function a blinded key K' comprising the blinded function of the first commitment and the server key k;
send the blinded key K' to the client computer; and
wherein client computer during the engagement is configured to unblind the blinded key K' to obtain a client key K comprising a deterministic function of the first commitment and the server key k.

2. The system of claim 1, wherein during the key-generation protocol the system further comprises:
the key server configured to encrypt the server key k via a homomorphic encryption scheme, under a public key of the encryption scheme, to produce an encrypted key, and to send the encrypted key to the client computer;
the client computer configured to encrypt the first commitment under the public key via the encryption scheme to produce an encrypted commitment, and to produce the blinded function of the first commitment by blinding a function of the encrypted key and the encrypted commitment using a nonce;
the key server configured to decrypt the blinded function of the first commitment, using a private key corresponding to the public key, via a decryption algorithm of the encryption scheme to obtain a decrypted value V, and to generate the blinded key K' from the decrypted value V; and
the client computer configured to obtain the client key K by unblinding the blinded key K' using the nonce.

3. The system of claim 2, wherein the key server is configured to generate the blinded key K' such that the client key K comprises a pseudorandom function of the first commitment and the server key k.

4. The system of claim 1, wherein the system further comprises:
the first proof of knowledge comprises a first sub-proof, proving knowledge of the first commitment in the third commitment, a second sub-proof proving that the second commitment and the third commitment are computed from a common value, and a third sub-proof;
the client computer configured to send the first sub-proof and the second sub-proof to the key server with the second commitment and the third commitment;
the key server configured to, responsive to verifying the first sub-proof and the second sub-proof, select the subset of the indices i and to send the subset to the client computer;
the client computer configured to generate the third sub-proof proving knowledge, for each of the indices i in the subset, of the data block $x_i$ of the vector x in the second commitment, and to send the third sub-proof to the key server; and the key server configured to verify the third sub-proof to verify the first proof of knowledge.

5. The system of claim 4, wherein the second commitment is computed from the first commitment and the common value comprises the first commitment.

6. The system of claim 1, wherein the system includes more than one of the client computer, each of the more than one client computer is adapted for communication with the key server via the network.

7. The system of claim 6, wherein each of the more than one client computer is further configured to encrypt the client data, using the client key K thereof, to produce a cipher-text, and to send the cipher-text for remote storage in the network.

8. The system of claim 7, wherein the system further comprises:
 a storage server connected to the network for storing cipher-texts received from the more than one client computer, and the storage server is configured to implement a deduplication process for the cipher-texts.

9. A method comprising:
 defining, by a client computer, a vector x, having a plurality n of data blocks $x_i$ with indices i=1 to n, corresponding to client data at the client computer;
 generating, by the client computer, a first commitment, wherein the first commitment is a non-hiding vector commitment, to the vector x;
 generating, by the client computer, a second commitment, wherein the second commitment is a hiding vector commitment, to the vector x;
 generating, by the client computer, a third commitment to the first commitment;
 sending, by the client computer, the second commitment and the third commitment to a key server;
 providing, by the client computer, to the key server a first proof of knowledge, for a subset of the indices i, of the corresponding data blocks $x_i$ of the vector x in the second commitment and the third commitment; and
 responsive to verifying the first proof by the key server:
 performing a key-generation protocol by sending, by the client computer, to the key server a blinded function of the first commitment and providing to the key server a second proof of knowledge of the first commitment in the blinded function and in the third commitment, receiving from the key server a blinded key K' generated from the blinded function and comprising the blinded function of the first commitment and a secret server key k of the key server, and unblinding the blinded key K' to obtain the client key K comprising a deterministic function of the first commitment and the server key k.

10. The method of claim 9, wherein performing the key-generation protocol comprises:
 receiving, by the client computer, from the key server an encrypted key produced by encrypting the server key via a homomorphic encryption scheme under a public key of the encryption scheme;
 encrypting, by the client computer, the first commitment under the public key via the encryption scheme to produce an encrypted commitment;
 producing, by the client computer, the blinded function of the first commitment by blinding a function of the encrypted key and the encrypted commitment using a nonce; and
 responsive to receiving the blinded key K' produced at the key server from a decrypted value V obtained by decrypting the blinded function of the first commitment, using, by the client computer, a private key corresponding to the public key, via a decryption algorithm of the encryption scheme, and unblinding the blinded key K' using the nonce.

11. The method of claim 10, wherein the first proof of knowledge comprises a first sub-proof, proving knowledge of the first commitment in the third commitment, a second sub-proof proving that the second commitment and the third commitment are computed from a common value, and a third sub-proof, and the method further comprising:
 sending, by the client computer, the first sub-proof and the second sub-proof to the key server with the second commitment and third commitment;
 responsive to verifying by the key server of the first sub-proof and the second sub-proof receiving, by the client computer, the subset of the indices i from the key server;
 generating, by the client computer, the third sub-proof proving knowledge, for each of the indices i in the subset, of the data block $x_i$ of the vector x in the second commitment;
 sending, by the client computer, the third sub-proof to the key server;
 encrypting, by the client computer, the client data using the client key K to produce a cipher-text; and
 sending, by the client computer, the cipher-text to a storage server connected to the network and configured to implement a deduplication process for stored cipher-texts.

12. The method of claim 9, wherein the first proof of knowledge comprises a first sub-proof, proving knowledge of the first commitment in the third commitment, a second sub-proof proving that the second commitment and the third commitment are computed from a common value, and a third sub-proof, and further comprising:
 sending, by the client computer, the first sub-proof and the second sub-proof to the key server with the second commitment and the third commitment;
 responsive to verifying by the key server of the first sub-proof and the second sub-proof, receiving, by the client computer, the subset of the indices i from the key server;
 generating, by the client computer, the third sub-proof proving knowledge, for each of the indices i in the subset, of the data block $x_i$ of the vector x in the second commitment; and
 sending, by the client computer, the third sub-proof to the key server.

13. The method of claim 12, further comprising:
 computing, by the client computer, the second commitment from the first commitment, wherein the common value comprises the first commitment.

14. The method of claim 9, further comprising:
 encrypting, by the client computer, the client data using the client key K to produce a cipher-text; and
 sending, by the client computer, the cipher-text to a storage server connected to the network and adapted to implement a deduplication process for stored cipher-texts.

15. A method for providing a client key K to a client computer, wherein the client computer provides client data and is adapted to define a vector x, having a plurality n of data blocks $x_i$ with indices i=1 to n, corresponding to the client data and to generate a first commitment, being a non-hiding vector commitment, to the vector x, the method comprising, at a key server adapted for communication with the client computer via a network:
  storing a secret server key k;
  receiving from the client computer a second commitment, being a hiding vector commitment, to the vector x and a third commitment to the first commitment;
  receiving from the client computer first proof of knowledge, for a subset of the indices i, of the corresponding data blocks $x_i$ of the vector x in the second and third commitments;
  verifying the first proof; and
  in a key-generation protocol performed in response to verification of the first proof, receiving from the client computer a blinded function of the first commitment and second proof of knowledge of the first commitment in the blinded function and in the third commitment, verifying the second proof and in response thereto, generating from the blinded function of the first commitment a blinded key K' comprising a blinded function of the first commitment and the server key k, and sending the blinded key K' to the client computer for unblinding at the client computer to obtain the client key K comprising a deterministic function of the first commitment and the server key k.

16. The method of claim 15 including, at the key server in the key-generation protocol:
  encrypting the server key k via a homomorphic encryption scheme, under a public key of the scheme, to produce an encrypted key;
  sending the encrypted key to the client computer for production of the blinded function of the first commitment by encrypting the first commitment under the public key via the encryption scheme to produce an encrypted commitment, and blinding a function of the encrypted key and the encrypted commitment using a nonce;
  decrypting the blinded function of the first commitment, using a private key corresponding to the public key, via a decryption algorithm of the encryption scheme to obtain a decrypted value V; and
  generating the blinded key K' from the decrypted value V such that the client computer can obtain the client key K by unblinding the blinded key K' using the nonce.

17. The method of claim 16 including generating the blinded key K' such that the client key K comprises a pseudorandom function of the first commitment and the server key k.

18. The method of claim 16, wherein the first proof of knowledge comprises a first sub-proof, proving knowledge of the first commitment in the third commitment, a second sub-proof proving that the second and third commitments are computed from a common value, and a third sub-proof, the method including at the key server:
  receiving the first and second sub-proofs from the client computer with the second and third commitments;
  verifying the first and second sub-proofs and, in response thereto, selecting the subset of the indices i and sending the subset to the client computer;
  receiving from the client computer the third sub-proof proving knowledge, for each of the indices i in the subset, of the data block $x_i$ of the vector x in the second commitment;
  verifying the third sub-proof to verify the first proof of knowledge; and in the key-generation protocol, generating the blinded key K' such that the client key K comprises a pseudorandom function of the first commitment and the server key k.

19. The method of claim 15, wherein the first proof of knowledge comprises a first sub-proof, proving knowledge of the first commitment in the third commitment, a second sub-proof proving that the second and third commitments are computed from a common value, and a third sub-proof, the method including at the key server:
  receiving the first and second sub-proofs from the client computer with the second and third commitments;
  verifying the first and second sub-proofs and, in response thereto, selecting the subset of the indices i and sending the subset to the client computer;
  receiving from the client computer the third sub-proof proving knowledge, for each of the indices i in the subset, of the data block $x_i$ of the vector x in the second commitment; and
  verifying the third sub-proof to verify the first proof of knowledge.

20. A computer-program product for obtaining a client key K at a client computer adapted for communication with a key server via a network, the computer-program product comprising a computer-readable storage medium having program instructions embodied therein, the program instructions being executable by the client computer, the program instructions comprising:
  program instructions to define a vector x, having a plurality n of data blocks $x_i$ with indices i=1 to n, corresponding to client data at the client computer;
  program instructions to generate a first commitment, being a non-hiding vector commitment, to the vector x;
  program instructions to generate a second commitment, being a hiding vector commitment, to the vector x;
  program instructions to generate a third commitment to the first commitment;
  program instructions to send the second and third commitments to the key server;
  program instructions to provide to the key server first proof of knowledge, for a subset of the indices i, of the corresponding data blocks $x_i$ of the vector x in the second and third commitments; and
  in a key-generation protocol performed in response to verification of the first proof by the key server, program instructions to send to the key server a blinded function of the first commitment and provide to the key server second proof of knowledge of the first commitment in the blinded function and in the third commitment, to receive from the key server a blinded key K' generated from the blinded function and comprising a blinded function of the first commitment and a secret server key k of the key server, and to unblind the blinded key K' to obtain the client key K comprising a deterministic function of the first commitment and the server key k.

21. The non-transitory computer-program product of claim 20, wherein the first proof of knowledge comprises a first sub-proof, proving knowledge of the first commitment in the third commitment, a second sub-proof proving that the second and third commitments are computed from a common value, and a third sub-proof, wherein the program instructions stored on the one or more computer readable storage media further comprise:
  program instructions to send the first and second sub-proofs to the key server with the second and third commitments;

program instructions to receive the subset of the indices i from the key server in response to verification by the key server of the first and second sub-proofs;
program instructions to generate the third sub-proof proving knowledge, for each of the indices i in the subset, of the data block xi of the vector x in the second commitment;
program instructions to send the third sub-proof to the key server;
and in the key-generation protocol, to receive from the key server an encrypted key produced by encrypting the server key via a homomorphic encryption scheme under a public key of the scheme, program instructions to encrypt the first commitment under the public key via the encryption scheme to produce an encrypted commitment; to produce the blinded function of the first commitment by blinding a function of the encrypted key and the encrypted commitment using a nonce; and, in response to receipt of the blinded key K' produced at the key server from a decrypted value V obtained by decrypting the blinded function of the first commitment, using a private key corresponding to the public key, via a decryption algorithm of the encryption scheme, to unblind the blinded key K using the nonce.

22. The non-transitory computer-program product of claim 21, wherein the program instructions stored on the one or more computer readable storage media further comprise:
program instructions to encrypt the client data using the client key K to produce a cipher-text;
and program instructions to send the cipher-text to a storage server connected to the network and adapted to implement a deduplication process for stored cipher-texts.

23. A non-transitory computer-program product for providing a client key K to a client computer adapted for communication with a key server via a network, wherein the client computer provides client data and is adapted to define a vector x, having a plurality n of data blocks xi with indices i=1 to n, corresponding to the client data and to generate a first commitment, being a non-hiding vector commitment, to the vector x, the non-transitory computer-program product comprising a computer-readable storage medium having program instructions embodied therein, the program instructions being executable by the key server, the program instructions comprising:
program instructions to store a secret server key k;
program instructions to receive from the client computer a second commitment, being a hiding vector commitment, to the vector x and a third commitment to the first commitment;
program instructions to receive from the client computer first proof of knowledge, for a subset of the indices i, of the corresponding data blocks xi of the vector x in the second and third commitments;
program instructions to verify the first proof;
and in a key-generation protocol performed in response to verification of the first proof, program instructions to receive from the client computer a blinded function of the first commitment and second proof of knowledge of the first commitment in the blinded function and in the third commitment, to verify the second proof and in response thereto, to generate from the blinded function of the first commitment a blinded key K comprising a blinded function of the first commitment and the server key k, and to send the blinded key K' to the client computer for unblinding at the client computer to obtain the client key K comprising a deterministic function of the first commitment and the server key k.

24. The non-transitory computer-program product of claim 23, wherein the first proof of knowledge comprises a first sub-proof, proving knowledge of the first commitment in the third commitment, a second sub-proof proving that the second and third commitments are computed from a common value, and a third sub-proof, and wherein the program instructions stored on the one or more computer readable storage media further comprise:
program instructions to receive the first and second sub-proofs from the client computer with the second and third commitments;
program instructions to verify the first and second sub-proofs and, in response thereto, to select the subset of the indices i and send the subset to the client computer;
program instructions to receive from the client computer the third sub-proof proving knowledge, for each of the indices i in the subset, of the data block xi of the vector x in the second commitment;
program instructions to verify the third sub-proof to verify the first proof of knowledge; and
in the key-generation protocol, program instructions to encrypt the server key k via a homomorphic encryption scheme, under a public key of the scheme, to produce an encrypted key, to send the encrypted key to the client computer for production of the blinded function of the first commitment by encrypting the first commitment under the public key via the encryption scheme to produce an encrypted commitment and blinding a function of the encrypted key and the encrypted commitment using a nonce, to decrypt the blinded function of the first commitment, using a private key corresponding to the public key, via a decryption algorithm of the encryption scheme to obtain a decrypted value V, and to generate the blinded key K' from the decrypted value V such that the client computer can obtain the client key K by unblinding the blinded key !7C using the nonce.

* * * * *